US011102408B2

(12) United States Patent
Shoda

(10) Patent No.: US 11,102,408 B2
(45) Date of Patent: Aug. 24, 2021

(54) OUTPUT APPARATUS AND CONTROL METHOD THEREOF

(71) Applicant: CANON KABUSHIKI KAISHA, Tokyo (JP)

(72) Inventor: Ryosuke Shoda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 16/446,911

(22) Filed: Jun. 20, 2019

(65) Prior Publication Data
US 2020/0007784 A1    Jan. 2, 2020

(30) Foreign Application Priority Data

Jun. 27, 2018 (JP) .............................. JP2018-122355

(51) Int. Cl.
*H04N 5/232*      (2006.01)
*G06F 3/0482*    (2013.01)

(52) U.S. Cl.
CPC ..... *H04N 5/232411* (2018.08); *G06F 3/0482* (2013.01); *H04N 5/232933* (2018.08)

(58) Field of Classification Search
CPC ....... H04N 5/232411; H04N 5/232933; H04N 5/23293; H04N 5/77; G06F 3/0482; G06F 1/3234; G06F 1/3209
See application file for complete search history.

(56) References Cited

U.S. PATENT DOCUMENTS

| 8,488,169 B2 | 7/2013 | Morita |
| 2011/0102841 A1 | 5/2011 | Morita |
| 2017/0272583 A1* | 9/2017 | Kasa ................... H04N 1/00214 |
| 2018/0189077 A1* | 7/2018 | Gupta ................... G06F 40/186 |

FOREIGN PATENT DOCUMENTS

| CN | 102075652 A | 5/2011 |
| CN | 103442170 A | 12/2013 |
| JP | 2015-091097 A | 5/2015 |
| JP | 2015-222879 A | 12/2015 |
| JP | 2018-067885 A | 4/2018 |

OTHER PUBLICATIONS

Jun. 26, 2020 Japanese Official Action in Japanese Appln. No. 2018-122355.
Mar. 17, 2021 Chinese Official Action in Chinese Patent Appln. No. 201910568376.5.

* cited by examiner

*Primary Examiner* — Yogesh K Aggarwal
(74) *Attorney, Agent, or Firm* — Venable LLP

(57) ABSTRACT

An output apparatus controls a display function of displaying a captured image on the display, and an output function of outputting the captured image to the external apparatus. The output apparatus performs control to restrict the display function and stop image capturing when an unoperated state in which no user operation is performed on the output apparatus has continued for a predetermined time period in a state where the display function is in execution and the output function is not in execution, and restrict the display function and continue image capturing when the unoperated state in which no user operation is performed on the output apparatus has continued for a predetermined time period in a state where both the display function and the output function are in execution.

23 Claims, 13 Drawing Sheets

OUTPUT APPARATUS AND CONTROL METHOD THEREOF

BACKGROUND OF THE INVENTION

Field of the Invention

The present invention relates to techniques to output image data to an external apparatus.

Description of the Related Art

Conventionally, an image capturing apparatus such as a digital camera is provided with a monitor that displays images, and enables a user to perform shooting while looking at a live view image displayed on the monitor. Furthermore, control is performed in which power consumption is reduced by turning OFF the power of a monitor when a user does not operate an apparatus for a certain continued period of time (Japanese Patent Laid-Open No. 2015-222879).

Furthermore, a communication interface called HDMI® (High-Definition Multimedia Interface) is mounted on an image capturing apparatus. A device that is connected using an HDMI®-compliant communication interface has a role of one or both of a source apparatus and a sink apparatus. The source apparatus can transmit image data via HDMI®. The sink apparatus receives the image data from the source apparatus via HDMI®, and displays the received image data on a display apparatus.

When an image is output to an external apparatus in the above-described manner, in order to reduce power consumption, the output of the image may presumably be stopped if no operation is performed for a certain time period. However, in a case where an output destination is not a display apparatus but an image recording device, stopping the output of the image will pause or end the recording of the image halfway.

SUMMARY OF THE INVENTION

The present invention has been made in consideration of the aforementioned problems, and realizes techniques that, when an image is output to an external apparatus, enable a reduction in power consumption and appropriate recording of the image on an output destination.

In order to solve the aforementioned problems, the present invention provides an output apparatus comprising: a display; an image capturing unit; a communication unit configured to communicate with an external apparatus; and a control unit configured to control a display function of displaying an image captured by the image capturing unit on the display, and an output function of outputting the image to the external apparatus, wherein the control unit performs control to restrict the display function and stop image capturing by the image capturing unit when an unoperated state in which no user operation is performed on the output apparatus has continued for a predetermined time period in a state where the display function is in execution and the output function is not in execution, and restrict the display function and continue image capturing by the image capturing unit when the unoperated state in which no user operation is performed on the output apparatus has continued for a predetermined time period in a state where both the display function and the output function are in execution.

In order to solve the aforementioned problems, the present invention provides an output apparatus comprising: a display; an image capturing unit; a communication unit configured to communicate with an external apparatus; and a control unit configured to control a display function of displaying an image captured by the image capturing unit on the display, and an output function of outputting the image captured by the image capturing unit to the external apparatus, wherein the control unit performs control to restrict the output of the image to the external apparatus when an unoperated state in which no user operation is performed on the output apparatus has continued for a predetermined time period in a state where the output function is in execution and the display function is not in execution, and restrict the display function and continue the output of the image to the external apparatus when the unoperated state in which no user operation is performed on the output apparatus has continued for a predetermined time period in a state where both the output function and the display function are in execution.

In order to solve the aforementioned problems, the present invention provides an output apparatus comprising: an output unit configured to output an image to an external apparatus; and a control unit configured to perform control to, when an unoperated state in which no user operation is performed on the output apparatus has continued for a predetermined time period, stop the output of the image to the external apparatus when the output unit is outputting the image and information to be displayed superimposed on the image, and continue the output of the image to the external apparatus when the output unit is outputting the image but is not outputting the information to be displayed superimposed on the image.

In order to solve the aforementioned problems, the present invention provides a method of controlling an output apparatus having a display, an image capturing unit, and a communication unit configured to communicate with an external apparatus, the method comprising: controlling a display function of displaying an image captured by the image capturing unit on the display, and an output function of outputting the image to the external apparatus, wherein the controlling performs control to restrict the display function and stop image capturing by the image capturing unit when an unoperated state in which no user operation is performed on the output apparatus has continued for a predetermined time period in a state where the display function is in execution and the output function is not in execution, and restrict the display function and continue image capturing by the image capturing unit when the unoperated state in which no user operation is performed on the output apparatus has continued for a predetermined time period in a state where both the display function and the output function are in execution.

In order to solve the aforementioned problems, the present invention provides a method of controlling an output apparatus having a display, an image capturing unit, and a communication unit configured to communicate with an external apparatus, the method comprising: controlling a display function of displaying an image captured by the image capturing unit on the display, and an output function of outputting the image captured by the image capturing unit to the external apparatus, wherein the controlling performs control to restrict the output of the image to the external apparatus when an unoperated state in which no user operation is performed on the output apparatus has continued for a predetermined time period in a state where the output function is in execution and the display function is not in execution, and restrict the display function and continue the output of the image to the external apparatus when the unoperated state in which no user operation is performed on the output apparatus has continued for a predetermined time period in a state where both the output function and the display function are in execution.

In order to solve the aforementioned problems, the present invention provides a method of controlling an output apparatus having an output unit configured to output an image to an external apparatus, the method comprising: performing control to, when an unoperated state in which no user operation is performed on the output apparatus has continued for a predetermined time period, stop the output of the image to the external apparatus when the output unit is outputting the image and information to be displayed superimposed on the image, and continue the output of the image to the external apparatus when the output unit is outputting the image but is not outputting the information to be displayed superimposed on the image.

In order to solve the aforementioned problems, the present invention provides a non-transitory computer-readable storage medium storing a program for causing a computer to function as an output apparatus comprising: a display; an image capturing unit; a communication unit configured to communicate with an external apparatus; and a control unit configured to control a display function of displaying an image captured by the image capturing unit on the display, and an output function of outputting the image to the external apparatus, wherein the control unit performs control to restrict the display function and stop image capturing by the image capturing unit when an unoperated state in which no user operation is performed on the output apparatus has continued for a predetermined time period in a state where the display function is in execution and the output function is not in execution, and restrict the display function and continue image capturing by the image capturing unit when the unoperated state in which no user operation is performed on the output apparatus has continued for a predetermined time period in a state where both the display function and the output function are in execution.

In order to solve the aforementioned problems, the present invention provides a non-transitory computer-readable storage medium storing a program for causing a computer to function as an output apparatus comprising: a display; an image capturing unit; a communication unit configured to communicate with an external apparatus; and a control unit configured to control a display function of displaying an image captured by the image capturing unit on the display, and an output function of outputting the image captured by the image capturing unit to the external apparatus, wherein the control unit performs control to restrict the output of the image to the external apparatus when an unoperated state in which no user operation is performed on the output apparatus has continued for a predetermined time period in a state where the output function is in execution and the display function is not in execution, and restrict the display function and continue the output of the image to the external apparatus when the unoperated state in which no user operation is performed on the output apparatus has continued for a predetermined time period in a state where both the output function and the display function are in execution.

In order to solve the aforementioned problems, the present invention provides a non-transitory computer-readable storage medium storing a program for causing a computer to function as an output apparatus comprising: an output unit configured to output an image to an external apparatus; and a control unit configured to perform control to, when an unoperated state in which no user operation is performed on the output apparatus has continued for a predetermined time period, stop the output of the image to the external apparatus when the output unit is outputting the image and information to be displayed superimposed on the image, and continue the output of the image to the external apparatus when the output unit is outputting the image but is not outputting the information to be displayed superimposed on the image.

According to the present invention, when an image is output to an external apparatus, power consumption can be reduced, and the image can be recorded appropriately on an output destination.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

In the present embodiment, an example in which an output apparatus is applied to a single-lens reflex digital camera as an image capturing apparatus will be described.

<Apparatus Configuration>

The configuration and functions of a digital camera according to the present embodiment will be described below with reference to FIGS. 1A, 1B and 2.

The external configuration of the digital camera 100 (referred to as "camera" below) according to the present embodiment will be described first with reference to FIGS. 1A and 1B.

Figure 1A:
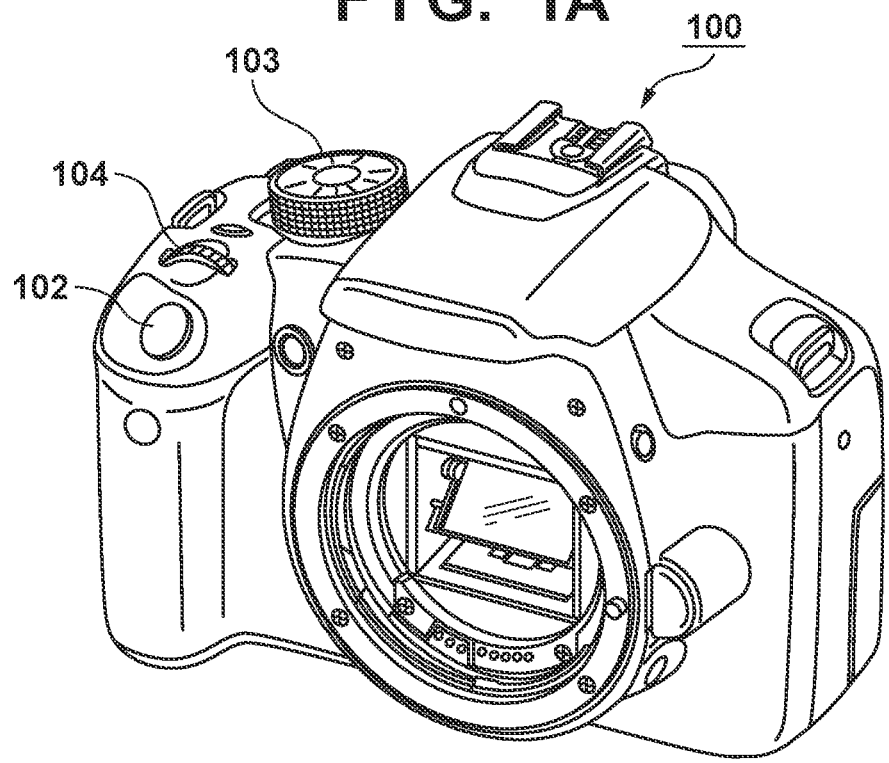
FIG. 1A is a front view showing an external configuration of an apparatus according to the present embodiment.
Figure 1B:
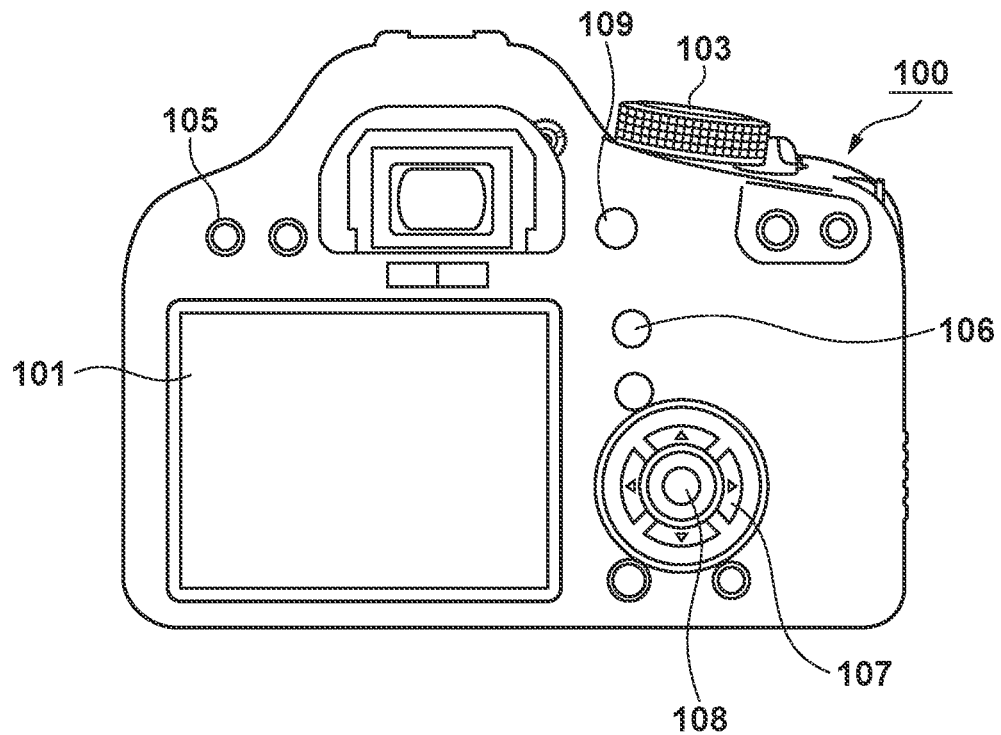
FIG. 1B is a back view showing an external configuration of an apparatus according to the present embodiment.

FIG. 1A is a front perspective view of the camera 100, and FIG. 1B is a back view of the camera 100.

In FIGS. 1A and 1B, a display unit 101 is a display device arranged on a back surface of a camera body for displaying images and various types of information, such as an LCD. Moreover, the display unit 101 has a function of reproducing a still image after the still image was shot, a function of displaying a moving image that is being recorded, and a live view display function as well. A shutter-release button 102 is a push-button type operation member for giving a shooting instruction. A mode dial 103 is a rotating type operation member for switching between operation modes of the camera 100. A main dial 104 is a rotating type operation member capable of changing setting values such as a shutter speed and a diaphragm aperture.

A menu button 105 is an operation member for displaying, on the display unit 101, a menu screen that enables various settings to be made. A shooting setting button 106 is an operation member for setting various shooting conditions in a shooting mode for shooting still images, moving images or the like. The cross key 107 is a movement instruction member capable of performing an operation in accordance with a pressed portion of the cross key 107, due to any one of up, down, left and right being pressed down. A SET button 108 is a push button, and is mainly used for determining a selection item and the like. A live view/recording button 109 is an operation member for giving an instruction to activate/end live view display that displays a still image in a still image shooting mode, and for giving an instruction to start/stop moving image recording processing in a moving image recording mode. In addition, the camera 100 according to the present embodiment includes a power switch that switches between ON and OFF of the power of the camera body, a display switch that switches between ON (display) and OFF (no display) of the power of the display unit 101, and the like. The power switch and the display switch allow a user operation to switch between ON and OFF, and also allow a system control unit 201 to switch between ON and OFF.

Figure 2:
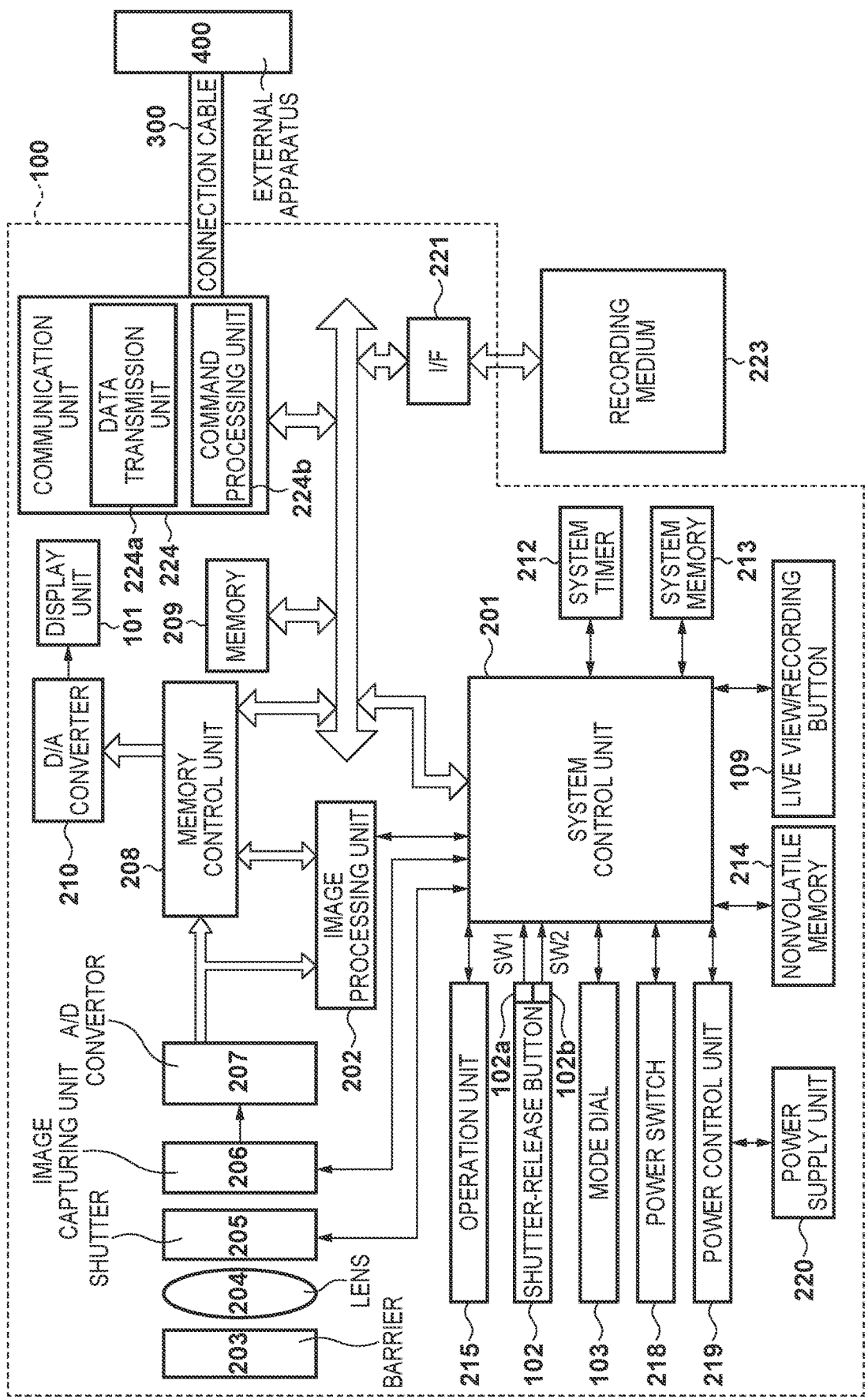
FIG. 2 is a block diagram showing an internal configuration of an apparatus according to the present embodiment.

FIG. 2 shows an internal configuration of the camera 100 according to the present embodiment.

In FIG. 2, a photographing lens 204 is a lens group that includes a zoom lens and a focusing lens. A shutter 205 has a diaphragm function. An image capturing unit 206 is an image sensor, which is constituted by a CCD, CMOS or the like, for converting the optical image of an object to an electric signal. An A/D converter 207 converts an analog signal to a digital signal. The A/D converter 207 is used to convert an analog signal, which is output from the image capturing unit 206, to a digital signal. A barrier 203 covers the image capturing system which includes the photographing lens 204 of the camera 100, thereby preventing contamination of and damage to the image capturing system that includes the photographing lens 204, a shutter 205 and image capturing unit 206. Note that the photographing lens 204 may be fixed to or detachable from the camera 100.

An image processing unit 202 performs resizing processing, such as predetermined pixel interpolation and reduction, and color conversion processing, on data from the A/D converter 207 or data from a memory control unit 208. Further, the image processing unit 202 performs predetermined calculation processing using the captured image data, and a system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 202 performs predetermined calculation processing using the captured image data, and AWB (Automatic White Balance) processing of TTL type is performed on the basis of the calculation results.

The output data from the A/D converter 207 is directly written into a memory 209 via both the image processing unit 202 and the memory control unit 208 or via the memory control unit 208. The memory 209 stores the image data obtained from the image capturing unit 206 and converted into digital data by the A/D converter 207, and image display data to be displayed on the display unit 101. The memory 209 has a storage capacity that is sufficient for storing a predetermined number of still images as well as moving images and audio for a predetermined time period.

The memory 209 also functions as a memory for image display (video memory). A D/A converter 210 converts the image display data stored in the memory 209 into an analog signal and supplies the display unit 101 with the analog signal. The image display data that was written into the memory 209 is displayed by the display unit 101 via the D/A converter 210. The display unit 101 performs, on a display device such as an LCD, display in accordance with the analog signal from the D/A converter 210. The digital signals once converted by the A/D converter 207 and stored in the memory 209 are converted into analog signals by the D/A converter 210, and the analog signals are successively transmitted to the display unit 101 so as to be displayed thereon, making it possible to realize an electronic view finder (EVF) functionality and to perform through the lens image display by a live view.

A nonvolatile memory 214 is, for example, an EEPROM, which is electrically erasable and recordable. In the nonvolatile memory 214, constants and programs, for example, for operating the system control unit 201 are stored. In this context, "programs" may refer to programs for executing a flowchart for control processing that will be described later. Furthermore, the nonvolatile memory 214 stores the settings of simultaneous output and setting values related to the power-saving settings, which will be described later.

The system control unit 201 is a calculation processing device for performing overall control of the camera 100, and realizes, by executing the programs stored in the nonvolatile memory 214, the display control processing of the present embodiment that will be described later. The system memory 213 is, for example, a RAM and used also as a work memory where constants and variables for operating the system control unit 201, EDID acquired from an external apparatus, and the programs read out from the nonvolatile memory 214 are expanded. The system control unit 201 controls the memory 209, the D/A converter 210, the display unit 101, and the like, so as to perform display control.

A system timer 212 is a time measurement unit that measures times used in various types of control, measures the time of an internal clock, and so on.

The mode dial 103, a first shutter switch 102a, a second shutter switch 102b and operation units 215 are operation members for inputting various types of instructions into the system control unit 201.

The mode dial 103 switches the operation mode of the system control unit 201 to any of a still image shooting mode, a moving image recording mode, and a reproduction mode. The still image shooting mode includes an automatic shooting mode, an automatic scene determination mode, a manual mode, scene-specific shooting modes, a program AE mode, a custom mode, and the like. Using the mode dial 103, the mode is directly switched to any of the plurality of modes included in the still image shooting mode. Alternatively, it is also possible to switch, using the mode dial 103, to the still image shooting mode and then to switch, using another operation member, to any of the plurality of modes included in the still image shooting mode. Similarly, also the moving image recording mode may include a plurality of modes.

In the still image recording mode, live view display of a still image can be activated using the live view/recording button 109. On the other hand, in the moving image recording mode, recording can be performed only during a live view of moving images; thus, activating the camera 100 in the moving image recording mode will activate live view display of moving images. In the moving image recording mode, an instruction to start/stop moving image recording processing is given to the system control unit 201 using the live view/recording button 109. The system control unit 201 starts processing of reading out a signal from the image capturing unit 206 and writing moving image data to the recording medium 223 by transmitting a notification for starting the recording of moving images to each unit of the camera 100, and stops the signal readout from the image capturing unit 206 and completes generation of moving image data by transmitting a notification for stopping the recording of moving images. In this case, the system control unit 201 may transmit a REC start/end command to an external apparatus 400 via a communication unit 224, as will be described later, at a timing at which an instruction to start/stop the recording of moving images is given.

While the shutter-release button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 202 to start the AF (Automatic Focus) processing, the AE (Automatic Exposure) processing, the AWB (Automatic White Balance) processing, the EF (flash pre-emission) processing and the like.

When the operation of the shutter-release button 102 is completed, that is, the shutter-release button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 206 to writing of image data to a recording medium 223.

By selecting various functional icons displayed on the display unit 101, appropriate functions for each situation are assigned to each operation member of the operation units 215, and the operation units 215 thus act as various function buttons. Examples of these function buttons include an end button, a back button, an image scrolling button, a jump button, a narrow-down button, an attribute change button and the like. For example, a menu screen that enables various settings to be made is displayed on the display unit 101 by pressing the menu button 105. The user can make various settings intuitively by using the menu screen, which is displayed on the display unit 101, a cross key 107 and the SET button 108. Included among the operation units 215 is also a touch panel (touch screen) that is capable of detecting a touch operation on the display unit 101. The system control unit 201 is capable of detecting touch operations and/or touch conditions performed by contacting the touch panel.

A power control unit 219 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 219 controls the DC-DC converter in accordance with the detection results and an instruction of the system control unit 201, and supplies a necessary voltage for a necessary length of time to each of the units including the recording medium 223.

A power supply unit 220 comprises a primary battery such as an alkaline battery or a lithium battery, a secondary battery such as an NiCd battery, an NiMH battery, or an Li-ion battery, or an AC adaptor. A recording medium interface (I/F) 222 is for interfacing with the recording medium 223 such as a memory card or a hard disk. The recording medium 223 is a recording medium such as a memory card for recording shot images, and constituted by a semiconductor memory, a magnetic disk, or the like.

As shown in FIG. 2, the camera 100 according to the present embodiment is communicably connected to the external apparatus 400 via a connection cable 300. The camera 100 and the external apparatus 400 can perform communication complying with the HDMI® (High-Definition Multimedia Interface) standard. Note that the connection cable 300 according to the present embodiment is, for example, a communication interface complying with the HDMI standard. The connection cable 300 includes a DDC (Display Data Channel) line and a TMDS (Transition-Minimized Differential Signaling) line. The connection cable 300 further includes a CEC (Consumer Electronics Control) line.

Note that the camera 100 according to the present embodiment is not limited to the image capturing apparatus, and may be an information processing apparatus such as a personal computer (PC), a mobile telephone, or a communication apparatus such as a smartphone, which is one type of a mobile telephone. Furthermore, the external apparatus 400 may be a device capable of recording images (an image recording device) such as a hard disk recorder and a Blu-ray recorder, a television receiver, an information processing apparatus such as a personal computer, or a display apparatus such as a projector.

In FIG. 2, the system control unit 201 of the camera 100 can obtain the image display capability and the audio processing capability of the external apparatus 400 by analyzing device information of the external apparatus 400 obtained from the external apparatus 400. The device information of the external apparatus 400 is EDID (Extended display identification data) or E-EDID (Enhanced EDID) recorded in the external apparatus 400. Each of the EDID and E-EDID includes, for example, identification information of the external apparatus 400, and information related to the resolution, the scanning frequency, the aspect ratio, the color space, and the like supported by the external apparatus 400. The E-EDID is the enhanced version of the EDID, and includes more capability information than the EDID. For example, the E-EDID includes information related to the format of image data and audio data supported by the external apparatus 400 and the like. Hereinafter, the EDID and E-EDID will be collectively referred to as "EDID". When the camera 100 has obtained the EDID from the external apparatus 400 via the connection cable 300, it analyzes the obtained EDID via a DDC line 501. The camera 100 can recognize the image display capability, the audio processing capability, and the like of the external apparatus 400 from the result of analyzing the EDID. Furthermore, the camera 100 can generate image data and audio data that are appropriate for the image display capability and the audio processing capability of the external apparatus 400.

A communication unit 224 includes a connection terminal (connector) for connecting to the connection cable 300. The communication unit 224 obtains the EDID from the external apparatus 400 via the DDC line. The EDID obtained from the external apparatus 400 is supplied to the system control unit 201. The communication unit 224 further includes a data transmission unit 224a and a command processing unit 224b.

The data transmission unit 224a can output image data appropriate for the image processing capability of the external apparatus 400, audio data appropriate for the audio processing capability of the external apparatus 400, and auxiliary data to the external apparatus 400 via the TMDS line. The image data and audio data that are output from the data transmission unit 224a to the external apparatus 400 are generated in accordance with the EDID obtained from the external apparatus 400.

The command processing unit 224b can transmit a command complying with the CEC protocol to the external apparatus 400 connected via the CEC line. Furthermore, the command processing unit 224b can receive a command complying with the CEC protocol from the external apparatus 400 connected via the CEC line.

Note that the command processing unit 224b can supply a command received from the external apparatus 400 to the system control unit 201. The system control unit 201 analyzes the command supplied from the command processing unit 224b, and controls the camera 100 in accordance with the result of analyzing the command.

Next, the configuration and functions of the external apparatus 400 will be described.

In a case where the external apparatus 400 is a display apparatus, image data of a live view image, a menu screen, or the like received from the camera 100 is displayed on a non-illustrated display panel, and audio data received from the camera 100 is output from a non-illustrated speaker. In a case where the external apparatus 400 is an image recording device (recorder), image data of a live view image, a menu screen, or the like and audio data received from the camera 100 is stored in a non-illustrated storage medium. The external apparatus 400 records the EDID. Furthermore, when the display settings of the external apparatus 400 have been changed, the external apparatus 400 rewrites information included in the EDID in accordance with the changed display settings.

The camera 100 according to the present embodiment can make settings so that, when the external apparatus 400 is connected via the connection cable 300, image data of a live view image, a menu screen, or the like is output simultaneously to the display unit 101 and the external apparatus 400.

Note that the hardware configuration is not limited to that shown in FIG. 2, and a configuration is also possible in which, for example, a single item of hardware performs display control, communication control, shooting control, image processing control, and the like, so as to function as each unit or block of the camera 100. Alternatively, it is also possible that a plurality of items of hardware operate in cooperation with each other to function as a single unit or block.

Figure 3A:
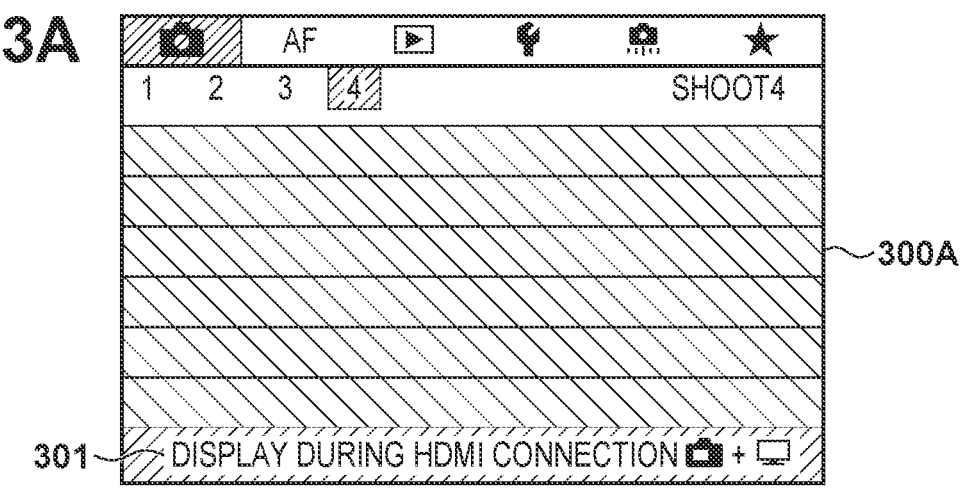
FIGS. 3A to 3C are diagrams showing examples of menu screens in the control processing of the present embodiment.
Figure 3B:
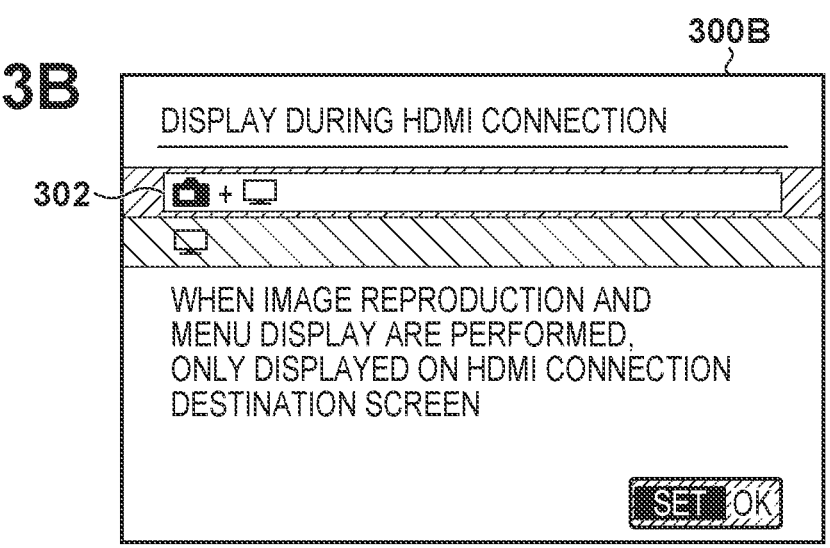
Figure 3C:
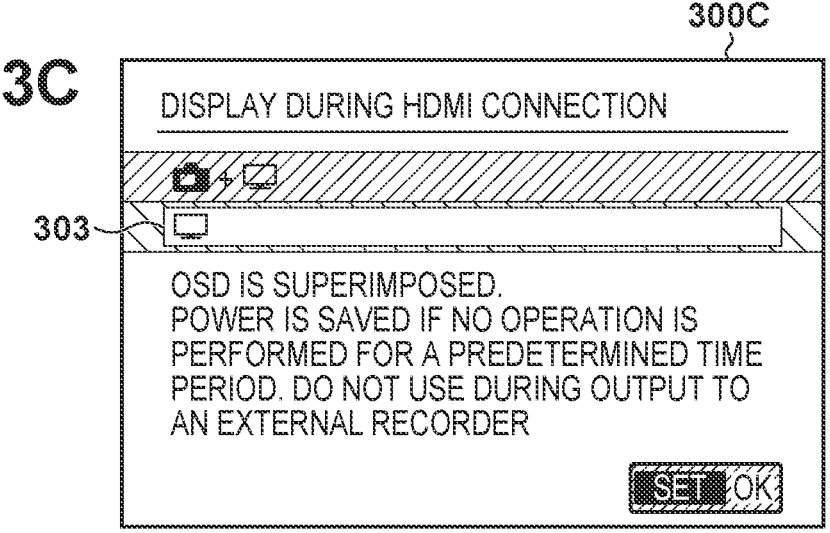

With reference to FIGS. 3A to 3C, the following describes an example of a menu screen for setting simultaneous output to the external apparatus 400, which is connected using HDMI, and the display unit 101.

A menu screen 300A shown in FIG. 3A is displayed on the display unit 101 when the menu button 105 is pressed by the user. A setting screen 300B of FIG. 3B is displayed when the user selects "display during HDMI connection" 301 by operating the operation units 215. By pressing the SET button 108 in a state where a selection item 302 is selected on the setting screen 300B of FIG. 3B, the user can make a setting that performs simultaneous display on the display unit 101 and the external apparatus 400. The setting screen 300B of FIG. 3B displays guidance indicating that, even when simultaneous output has been set, an image is not displayed on the display unit 101 but is displayed only on a screen of an HDMI connection destination in the case of image reproduction and in the case of display of the menu screen. That is, a live view image is simultaneously displayed.

Pressing a down portion of the cross key 107 on the setting screen 300B of FIG. 3B will make a transition to a setting screen 300C of FIG. 3C. By pressing the SET button 108 in a state where a selection item 303 is selected on the setting screen 300C of FIG. 3C, the user can make a setting that performs display/output only on/to the HDMI connection destination.

When it is determined that the external apparatus 400 is connected to the camera 100 via the connection cable 300 and live view display has been activated based on information obtained by the communication unit 224, the system control unit 201 controls an output destination(s) of image data in accordance with the image output settings.

When only an external connection destination (external apparatus 400) serves as the output destination, the data transmission unit 224a outputs, to the external apparatus 400, a result of superimposing OSD (On Screen Display) on image data which was generated by the image capturing unit 206 and to which image processing was applied by the image processing unit 202. When the external apparatus 400 is a display apparatus, the external apparatus 400 displays image data in which OSD is superimposed on a live view image. This is for enabling the user to make various types of settings based on an image displayed on the external apparatus 400, because image data is not output to the display unit 101. In this case, audio data generated by a non-illustrated microphone is also output, together with image data, by the data transmission unit 224a to the external apparatus 400. OSD includes display information such as parameters and lens positions used in image capturing processing by the image capturing unit 206, as well as display information such as software buttons included in the menu screen.

Figure 5A:
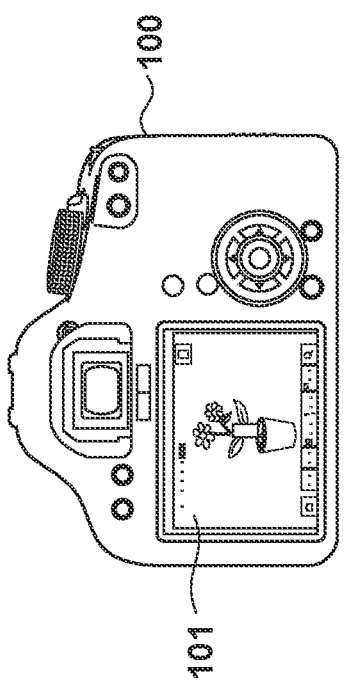
FIGS. 5A to 5F are diagrams illustrating a technical problem of the present embodiment.
Figure 5B:
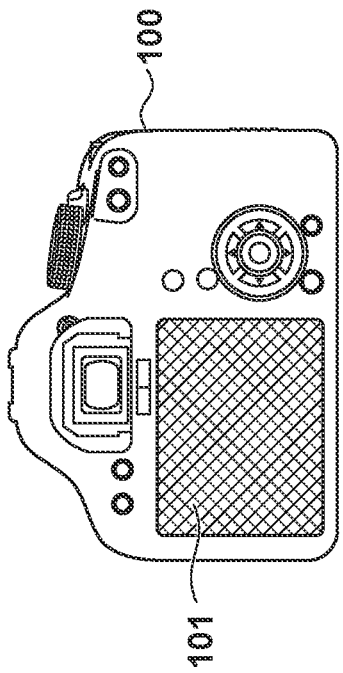
Figure 5C:
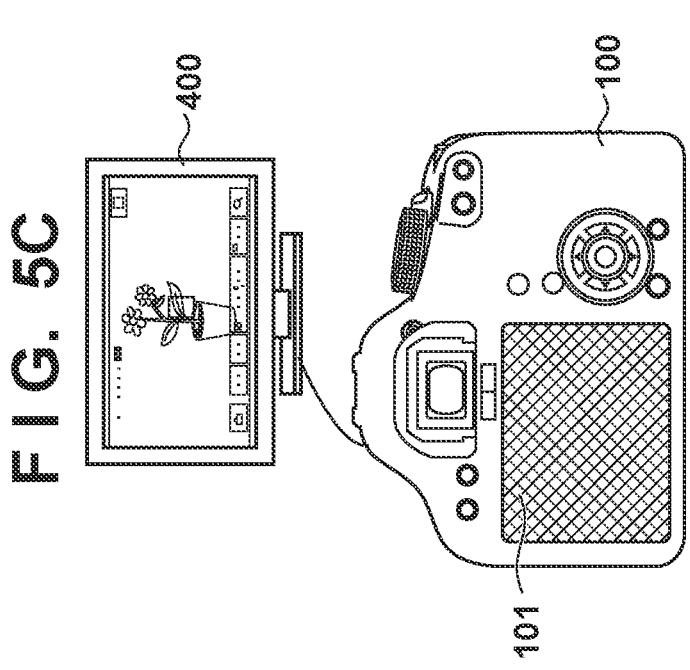

FIG. 5C, which will be described later, shows an example of display of image data that has been output to the external apparatus 400 with OSD superimposed on the image data. Note that using a non-illustrated info button included in the operation units 215, the amount of information to be displayed can be increased and reduced, and information such as currently-selected parameters can be set to be hidden during live view display. However, even when OSD is set to be hidden, information such as photometric values is displayed when AF has been executed by pressing the shutter-release button 102. Also, an icon indicating that moving images are currently recorded is displayed when the recording of moving images has been started by pressing the live view/recording button 109.

As described above, when only the external connection destination (external apparatus 400) serves as the output destination, OSD is superimposed on image data to enable user operations on the external apparatus 400, and continuous image output during display-OFF in control processing, which will be described later, is not performed. This is inappropriate when an image is output to an image recording device. In view of this, as shown in FIG. 3C, when the selection item 303 that makes only the external connection destination (external apparatus 400) the output destination is focused on the menu screen 300C, guidance indicating, for example, "OSD is superimposed. Power is saved if no operation is performed for a predetermined time period. Do not use during output to an external recorder" is displayed.

In the case of simultaneous output whereby an internal monitor (display unit 101) and the external connection destination (external apparatus 400) serve as output destinations, the display unit 101 performs live view display in which OSD is superimposed on image data which was generated by the image capturing unit 206 and to which image processing was applied by the image processing unit 202. Note that although the amount of information to be displayed can be increased and reduced and various types of information can be set to be hidden using the non-illustrated info button included in the operation units 215 as stated earlier, a layer that includes no information to be displayed as image data is superimposed as OSD. In this case, to the eyes of the user, nothing seems to be superimposed. Note that processing for superimposing a layer may not be executed when various types of information are set to be hidden.

Figure 5D:
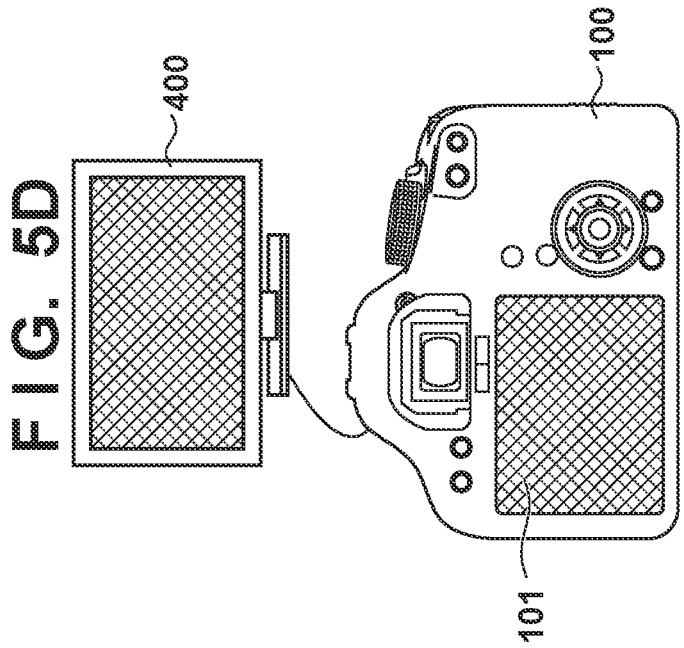
Figure 5E:
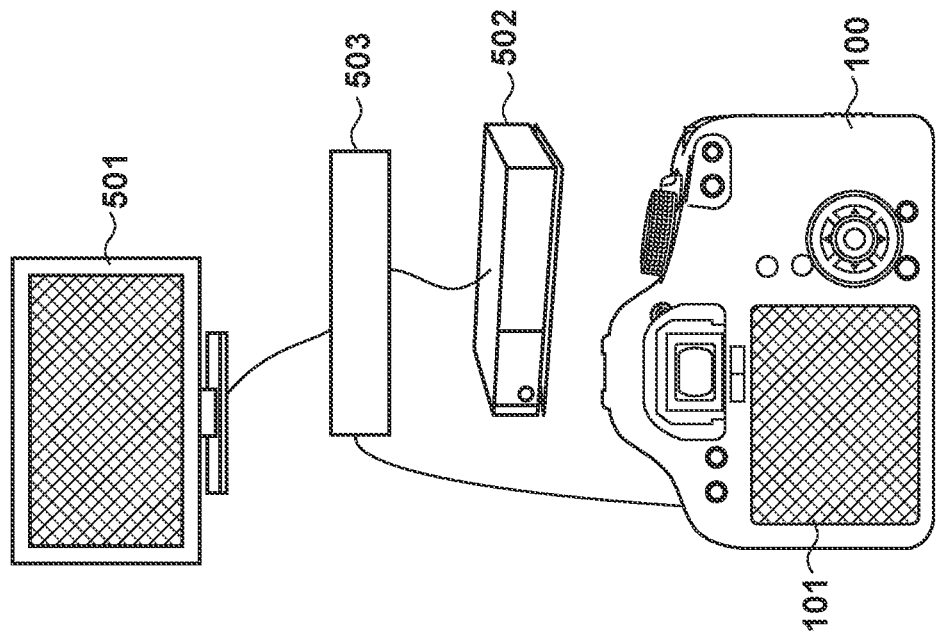

Meanwhile, the data transmission unit 224a outputs image data on which OSD is not superimposed to the external apparatus 400. When the external apparatus 400 is a display apparatus, the external apparatus 400 performs live view display of image data on which OSD is not superimposed. On the other hand, when the external apparatus 400 is an image recording device, image data on which OSD is not superimposed is recorded. Audio data generated by the non-illustrated microphone is also output, together with image data, by the data transmission unit 224a to the external apparatus 400. FIG. 5E shows an example of display of image data on which OSD is not superimposed. In FIG. 5E, an apparatus 503 that distributes image data to a display apparatus 501, which serves as the external apparatus 400, and to an image recording device 502 is an HDMI hub, for example.

In the case of simultaneous output, when the external apparatus 400 is an image recording device, presumably there may be a use case in which various types of settings are made as the display unit 101 displays image data on which OSD is superimposed, and at the same time, clean image data on which OSD is not superimposed is output to and recorded on the external apparatus 400. Conversely, in a case where image data on which OSD is superimposed is output and continuous image output is not performed during display-OFF, which will be described later, output to the image recording device is not appropriate, and thus the guidance illustrated in FIG. 3C is displayed.

Figure 4A:
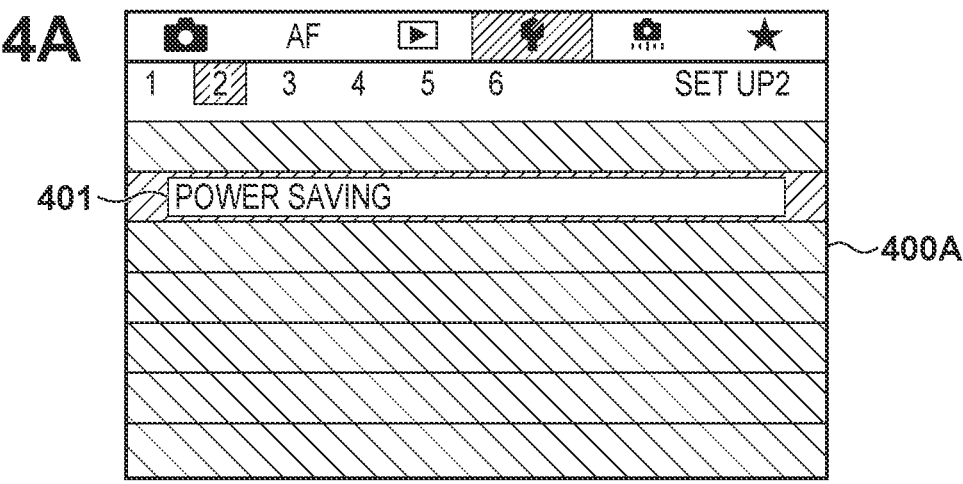
FIGS. 4A to 4C are diagrams showing examples of setting screens in the control processing of the present embodiment.
Figure 4B:
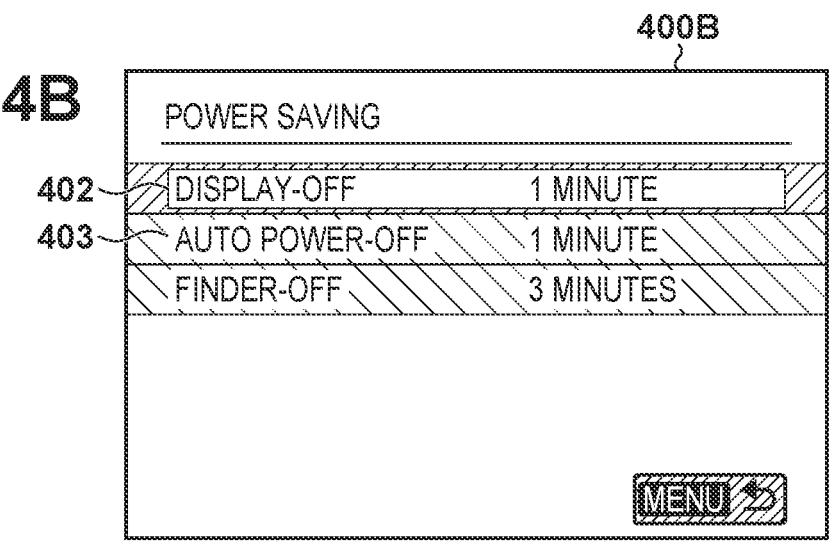
Figure 4C:
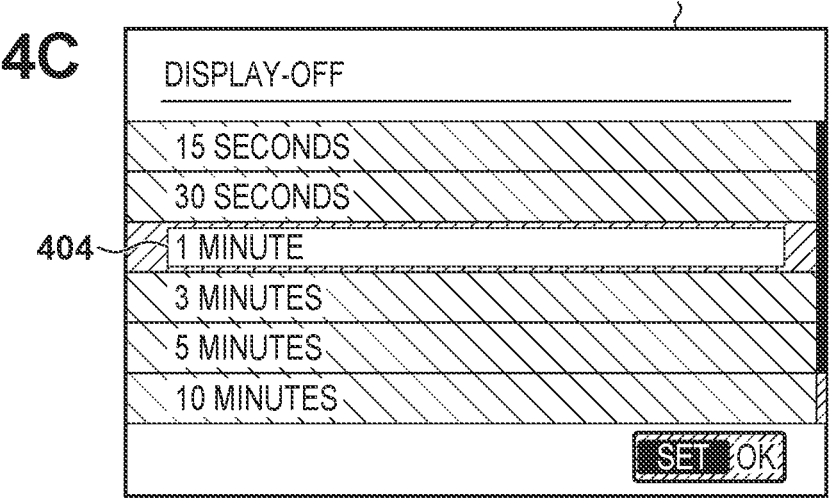

The camera 100 according to the present embodiment can make settings for power saving. With reference to FIGS. 4A to 4C, the following describes examples of setting screens for making the power-saving settings.

A menu screen 400A shown in FIG. 4A is displayed on the display unit 101 when the menu button 105 is pressed by the user. A setting screen 400B of FIG. 4B is displayed when the user selects "power saving" 401 by operating the operation units 215. When the user presses the SET button 108 in a state where a selection item 402 is selected on the setting screen 400B of FIG. 4B, a transition is made to a setting screen 400C of FIG. 4C. On the setting screen 400C of FIG. 4C, it is possible to set a time period until display-OFF, in which the power of the display unit 101 of the camera 100 is turned OFF and display is not performed when the camera 100 is in an unoperated state. For example, when the user presses the SET button 108 in a state where a selection item 404 is selected on the setting screen 400C of FIG. 4C, one minute can be set as the time period until display-OFF in which the power of the display unit 101 is turned OFF. Upon implementation of display-OFF, the display unit 101 is placed in a state where display is not performed, and driving of the image capturing unit 206 is stopped as well, thereby enabling power saving of the camera 100.

Furthermore, on the setting screen 400B of FIG. 4B, it is possible to set a time period until auto power-OFF, in which the power of the camera 100 is turned OFF when the camera 100 is in the unoperated state. For example, when the user presses the SET button 108 in a state where a selection item 403 is selected on the setting screen 400B of FIG. 4B, one minute can be set as the time period until auto power-OFF, in which the power of the camera 100 is turned OFF, after the implementation of display-OFF. Note that regarding the time period until auto power-OFF, "do not perform auto power-OFF" may be settable on a non-illustrated setting screen in consideration of recording of image data on an image recording device serving as the external connection destination. When "do not perform auto power-OFF" is set, auto power-OFF is not performed even if the unoperated state of the camera 100 continues for a predetermined time period. Furthermore, in the case of simultaneous output, the setting may be automatically changed to "do not perform auto power-OFF" or a preset period until auto power-OFF may be extended, and when only the external apparatus 400 serves as the output destination, auto power-OFF may be performed after a preset time period. These settings of the output destination(s) and setting values related to the power-saving settings are stored in the nonvolatile memory 214.

With reference to FIGS. 5A to 5F, the following describes a technical problem of a case where display-OFF is implemented at the time of simultaneous output according to the present embodiment.

When the power-saving settings have been made on the camera 100 as shown in FIGS. 4A to 4C, display-OFF is implemented if the unoperated state continues for a predetermined time period in a state where the external apparatus 400 is not connected to the camera 100 and live view display is performed only on the display unit 101 as shown in FIG. 5A. In this case, even if the power of the display unit 101 is turned OFF and driving of the image capturing unit 206 is stopped as shown in FIG. 5B, there will be no inconvenience as the user has no intention to perform shooting.

Figure 5F:
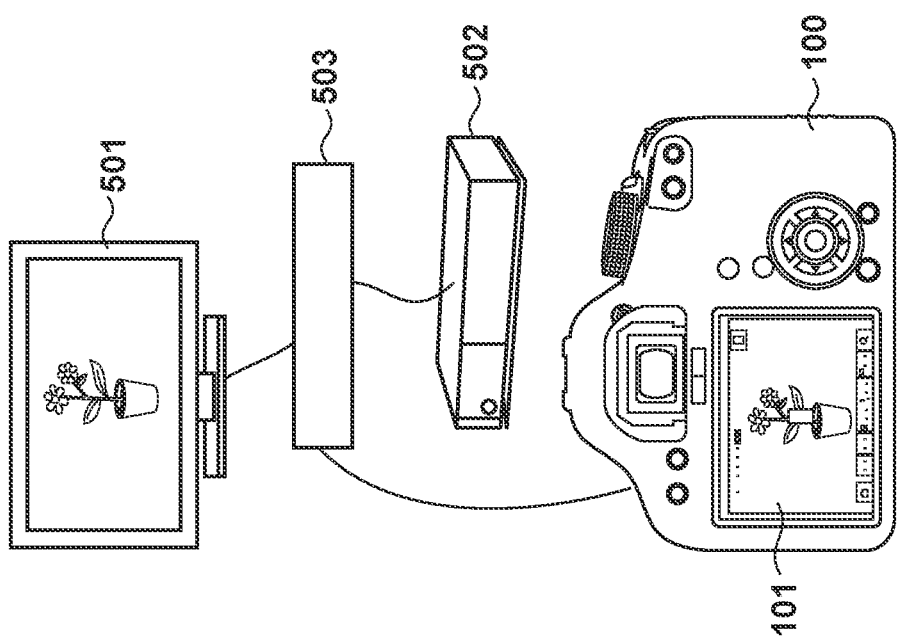
Figure 6A:
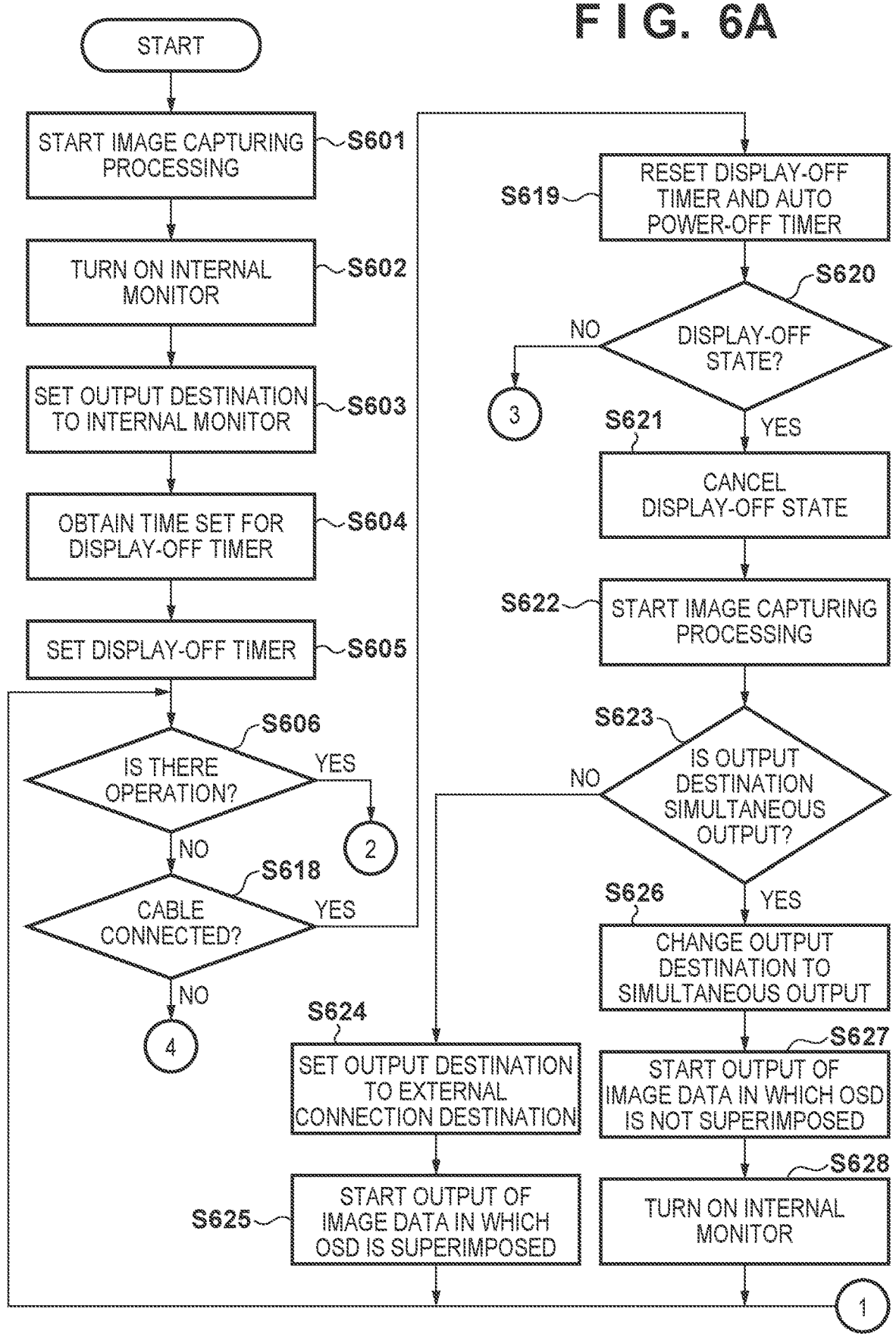
FIGS. 6A to 6F are flowcharts showing control processing of the present embodiment.
Figure 6B:
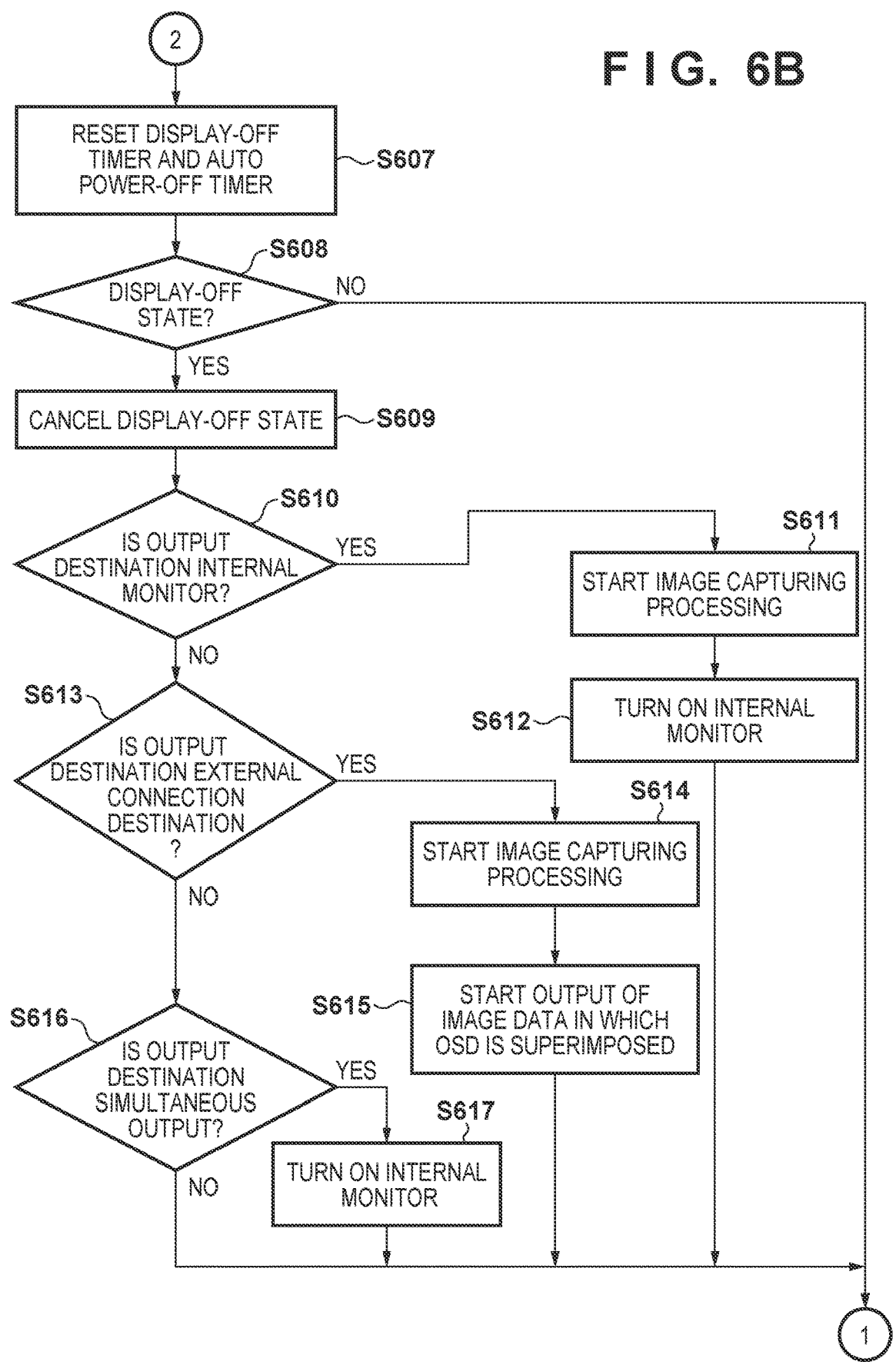
Figure 6C:
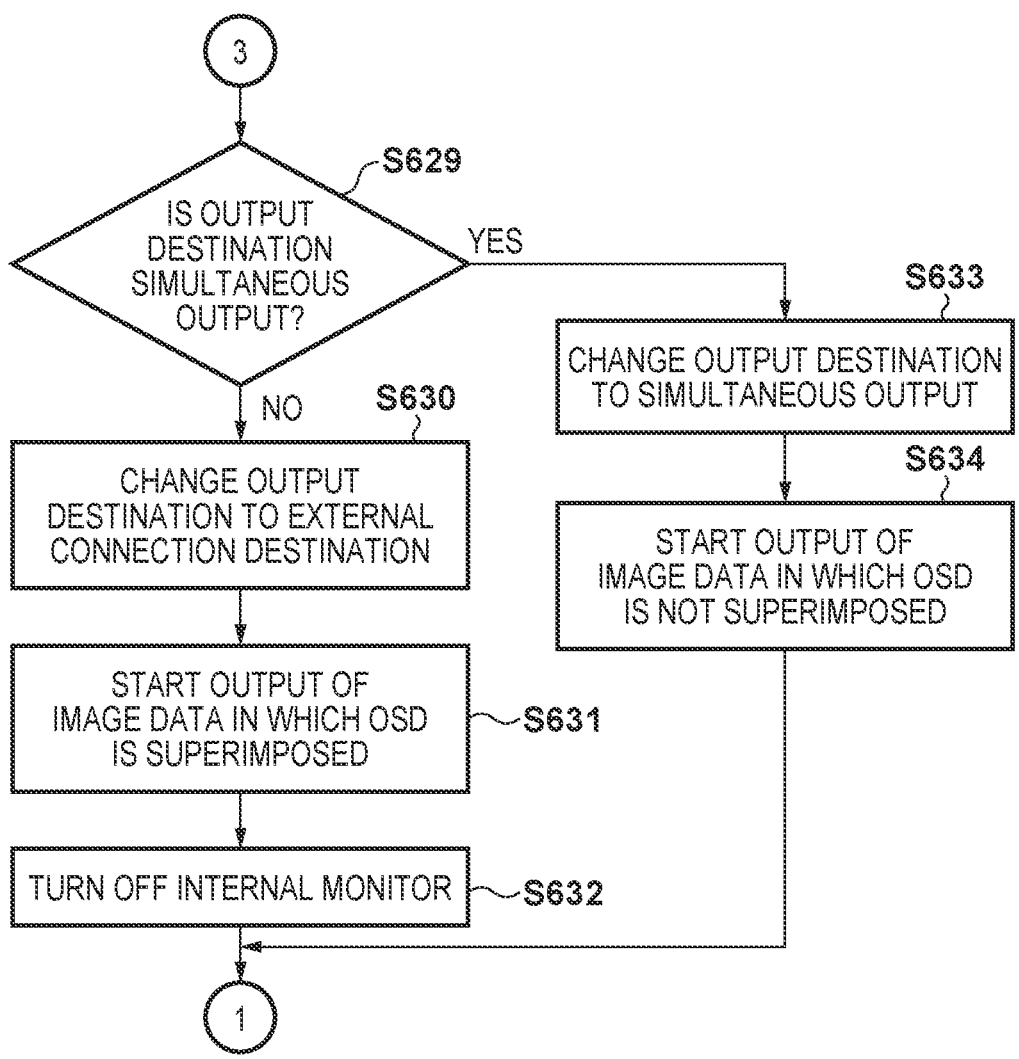
Figure 6D:
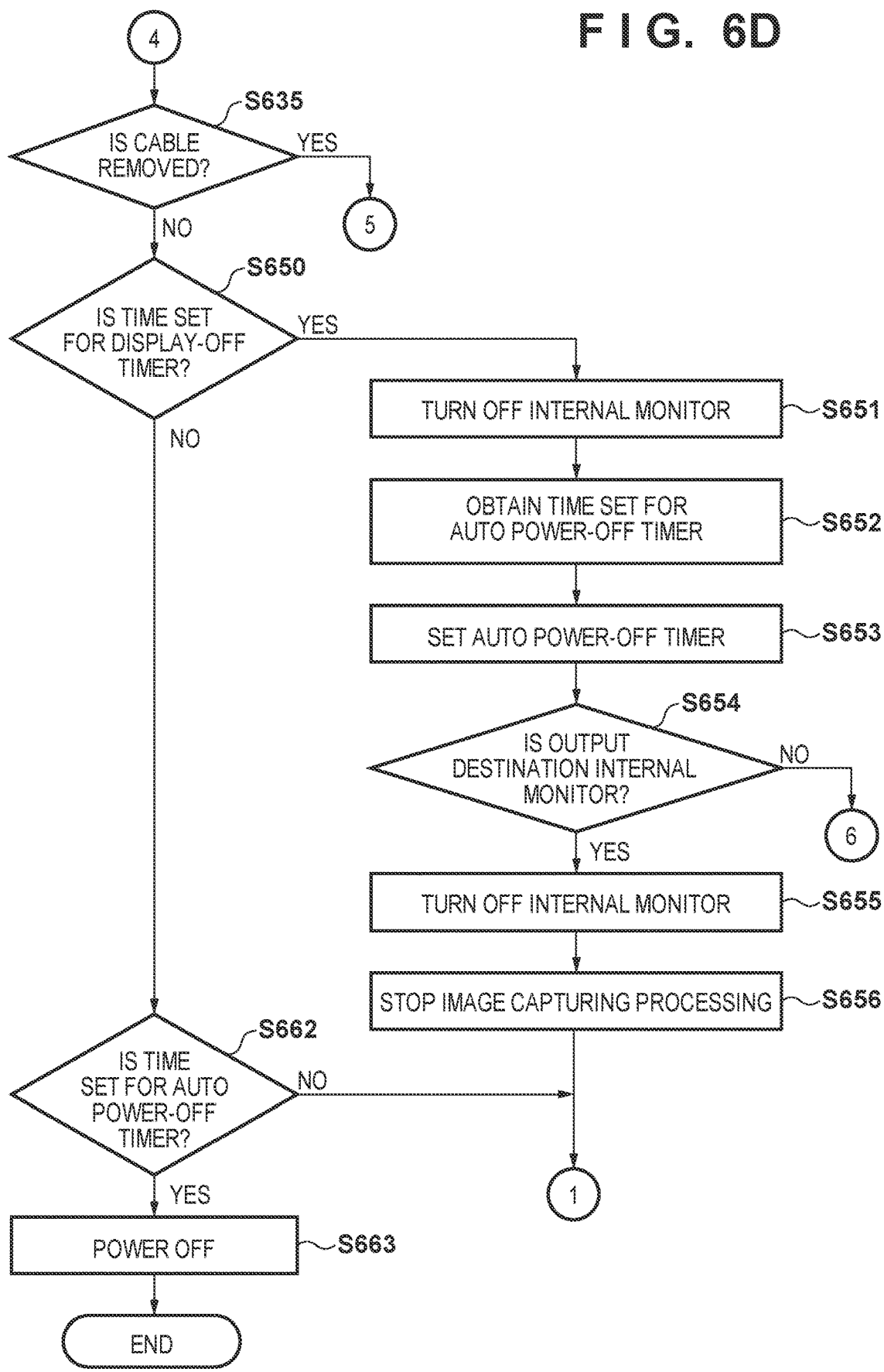
Figure 6E:
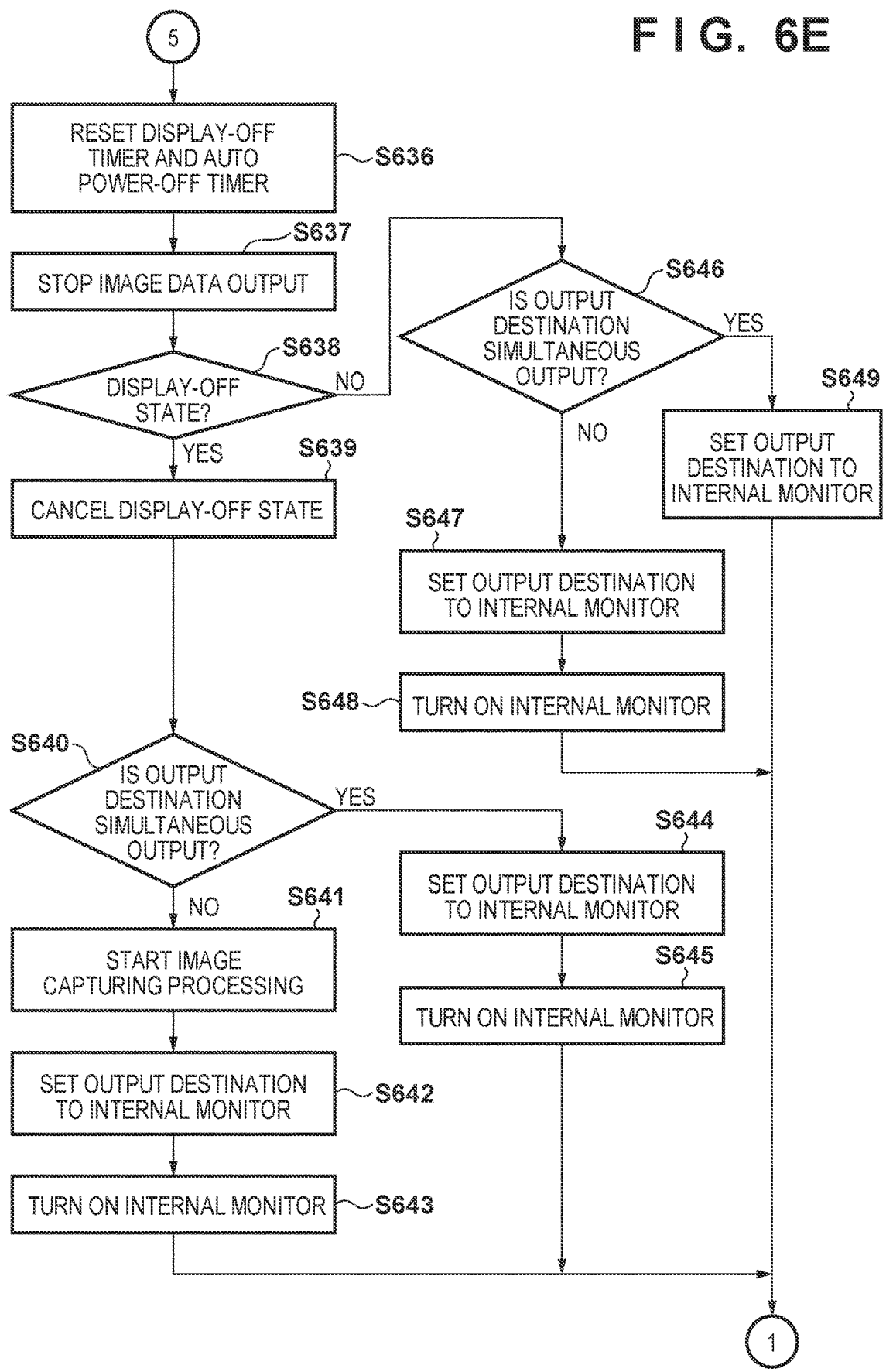
Figure 6F:
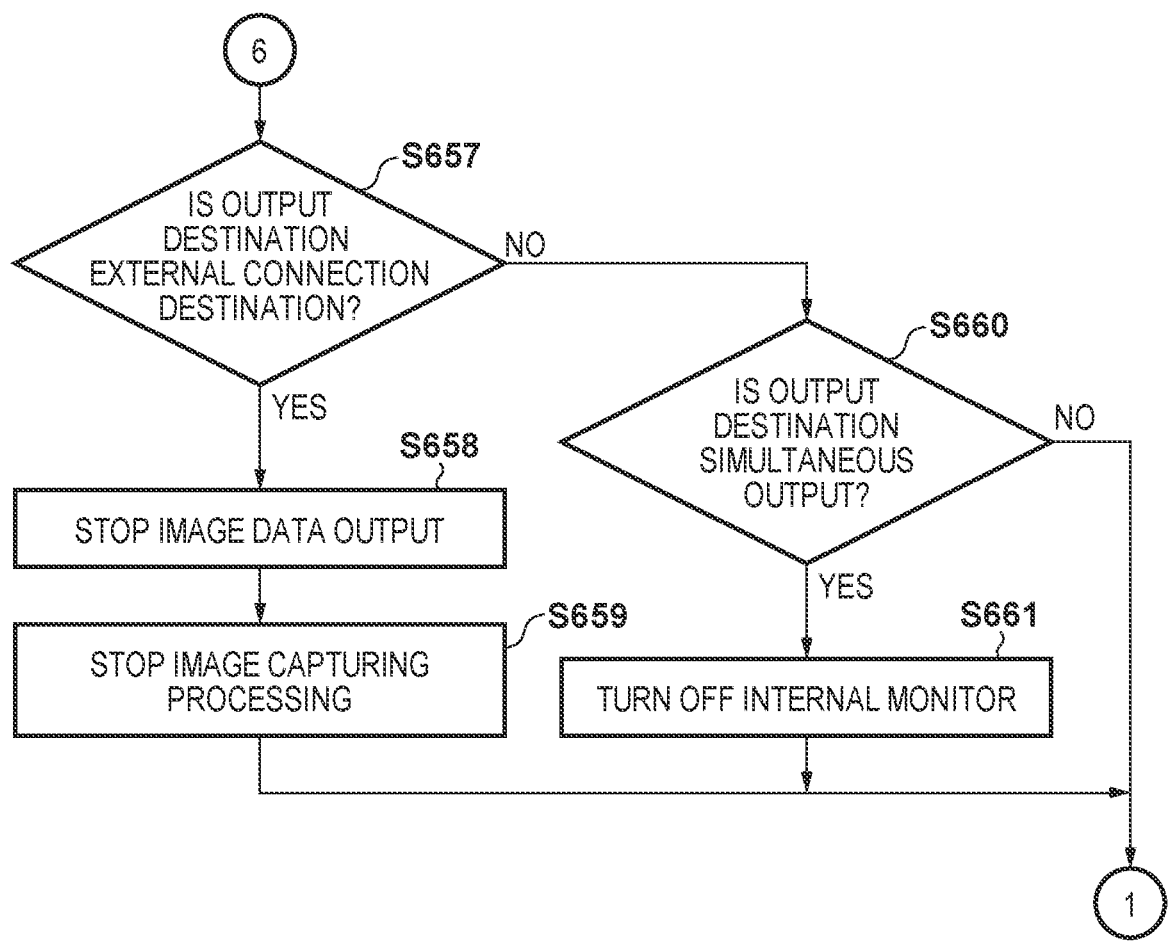

On the other hand, when the power-saving settings have been made on the camera 100 as shown in FIGS. 4A to 4C, display-OFF is implemented if the unoperated state continues for a predetermined time period in a state where the external apparatus 400 is connected to the camera 100 and live view display is performed only on the external apparatus 400 as shown in FIG. 5C. In this case, even if the output of image data to the external apparatus 400 is stopped and driving of the image capturing unit 206 is stopped as shown in FIG. 5D, there will be no inconvenience as the user has no intention to perform shooting. Meanwhile, assume a case where, when the external apparatus 400 is connected to the camera 100 and the settings of simultaneous output have been made, display-OFF is implemented due to continuation of the unoperated state for a predetermined time period in a state where image data is simultaneously displayed on the display unit 101 and the external apparatus 400 as shown in FIG. 5E. In this case, if the output of image data to the external apparatus 400 is stopped and driving of the image capturing unit 206 is stopped as shown in FIG. 5F, image output to the external apparatus 400 is stopped against the user's intention even though clean image data on which OSD is not imposed is currently recorded on the external apparatus 400. On the other hand, if display-OFF is disabled, high power consumption of the camera 100 is maintained, thereby giving rise to inconveniences including the inability to perform long-duration shooting. In view of such inconveniences, in the present embodiment, when display-OFF has been implemented at the time of simultaneous output due to continuation of the unoperated state for a predetermined time period, control processing is performed in which the power of the display unit 101 is turned OFF but image output is continued without stopping the image capture, as will be described later with reference to FIGS. 6A to 6F.

The control processing of the present embodiment will be described below with reference to FIGS. 6A to 6F.

Note that processing of FIGS. 6A to 6F is realized by the system control unit 201 of the camera 100 deploying a program that has been read out from the nonvolatile memory 214 to the system memory 213 and executing the program. The following describes processing for a case where the camera 100 has been activated in a state where the external apparatus 400 is not connected thereto and the camera 100 has been set to a live view display mode.

In step S601, the system control unit 201 starts image capturing processing by controlling the image capturing unit 206.

In step S602, the system control unit 201 lights the internal monitor (display unit 101) by turning ON the power of the internal monitor, and performs live view display. FIG. 5A shows a state where live view display is performed on the display unit 101 of the camera 100.

In step S603, the system control unit 201 sets an output destination to indicate the internal monitor (display unit 101). The system control unit 201 sets a state variable that represents the output destination and is retained in the system memory 213 to indicate the internal monitor (display unit 101).

In step S604, the system control unit 201 obtains a time set for a display-OFF timer from the nonvolatile memory 214.

In step S605, the system control unit 201 sets the display-OFF timer in the system timer 212.

In step S606, the system control unit 201 determines whether some sort of operation has been accepted with respect to the camera 100; it proceeds to step S607 if it is determined that some sort of operation has been accepted, and proceeds to step S618 if it is not determined that some sort of operation has been accepted.

In step S607, the system control unit 201 resets the display-OFF timer and an auto power-OFF timer set in the system timer 212, and restarts the display-OFF timer.

In step S608, the system control unit 201 determines whether the current state is a display-OFF state; it proceeds to step S609 if it is determined that the current state is the display-OFF state, and returns to step S606 if it is not determined that the current state is the display-OFF state.

In step S609, the system control unit 201 cancels the display-OFF state. The system control unit 201 clears a state variable that represents the display-OFF state and is retained in the system memory 213.

In step S610, the system control unit 201 determines whether the output destination indicates the internal monitor (display unit 101); it proceeds to step S611 if it is determined that the output destination indicates the internal monitor (display unit 101), and proceeds to step S613 if it is not determined that the output destination indicates the internal monitor (display unit 101).

In step S611, the system control unit 201 starts the image capturing processing by controlling the image capturing unit 206.

In step S612, the system control unit 201 lights the internal monitor (display unit 101) by turning ON the power of the internal monitor, and returns to step S606.

In step S613, the system control unit 201 determines whether the output destination indicates the external connection destination (external apparatus 400); it proceeds to step S614 if it is determined that the output destination indicates the external connection destination, and proceeds to step S616 if it is not determined that the output destination indicates the external connection destination.

In step S614, the system control unit 201 starts the image capturing processing by controlling the image capturing unit 206.

In step S615, the system control unit 201 starts processing for outputting image data in which OSD is superimposed on a live view image to the external connection destination, and returns to step S606. FIG. 5C shows an example of display, on the external apparatus 400, of an image in which OSD is superimposed on a live view image.

In step S616, the system control unit 201 reads out the settings of simultaneous output (simultaneous display on the display unit 101 and the external apparatus 400) from the nonvolatile memory 214, and determines whether the output destination indicates simultaneous output. The system control unit 201 proceeds to step S617 if it is determined that the output destination indicates simultaneous output, and returns to step S606 if it is not determined that the output destination indicates simultaneous output.

In step S617, the system control unit 201 lights the internal monitor (display unit 101) by turning ON the power of the internal monitor, and returns to step S606.

In step S618, the system control unit 201 determines whether the connection cable 300 has been connected; it proceeds to step S619 if it is determined that the connection cable 300 has been connected, and proceeds to step S635 if it is not determined that the connection cable 300 has been connected.

In step S619, the system control unit 201 resets the display-OFF timer and the auto power-OFF timer set in the system timer 212, and restarts the display-OFF timer.

In step S620, the system control unit 201 determines whether the current state is the display-OFF state; it proceeds to step S621 if it is determined that the current state is the display-OFF state, and proceeds to step S629 if it is not determined that the current state is the display-OFF state.

In step S621, the system control unit 201 cancels the display-OFF state. The system control unit 201 clears the state variable that represents the display-OFF state and is retained in the system memory 213.

In step S622, the system control unit 201 starts the image capturing processing by controlling the image capturing unit 206.

In step S623, the system control unit 201 reads out the settings of simultaneous output (simultaneous display on the display unit 101 and the external apparatus 400) from the nonvolatile memory 214, and determines whether the output destination indicates simultaneous output. The system control unit 201 proceeds to step S626 if it is determined that the output destination indicates simultaneous output, and proceeds to step S624 if it is not determined that the output destination indicates simultaneous output.

In step S624, the system control unit 201 sets the output destination to indicate the external connection destination (external apparatus 400). The system control unit 201 sets the state variable that represents the output destination and is retained in the system memory 213 to indicate the external connection destination (external apparatus 400).

In step S625, the system control unit 201 starts processing for outputting image data in which OSD is superimposed on a live view image to the external connection destination, and returns to step S606.

In step S626, the system control unit 201 sets the output destination to indicate simultaneous output (simultaneous display on the display unit 101 and the external apparatus 400). The system control unit 201 sets the state variable that represents the output destination and is retained in the system memory 213 to indicate simultaneous output (simultaneous display on the display unit 101 and the external apparatus 400).

In step S627, the system control unit 201 starts processing for outputting image data in which OSD is not superimposed on a live view image to the external connection destination. FIG. 5E shows an example of display, on the external apparatus 400, of an image in which OSD is not superimposed on a live view image.

In step S628, the system control unit 201 lights the internal monitor (display unit 101) by turning ON the power of the internal monitor, performs live view display, and returns to step S606.

In step S629, the system control unit 201 reads out the settings of simultaneous output (simultaneous display on the display unit 101 and the external apparatus 400) from the nonvolatile memory 214, and determines whether the output destination indicates simultaneous output. The system control unit 201 proceeds to step S633 if it is determined that the output destination indicates simultaneous output, and proceeds to step S630 if it is not determined that the output destination indicates simultaneous output.

In step S630, the system control unit 201 sets the output destination to indicate the external connection destination (external apparatus 400). The system control unit 201 sets the state variable that represents the output destination and is retained in the system memory 213 to indicate the external connection destination (external apparatus 400).

In step S631, the system control unit 201 starts processing for outputting image data in which OSD is superimposed on a live view image to the external connection destination.

In step S632, the system control unit 201 turns off the light of the internal monitor (display unit 101) by turning OFF the power of the internal monitor, and returns to step S606.

In step S633, the system control unit 201 sets the output destination to indicate simultaneous output (simultaneous display on the display unit 101 and the external apparatus 400). The system control unit 201 sets the state variable that represents the output destination and is retained in the system memory 213 to indicate simultaneous output (simultaneous display on the display unit 101 and the external apparatus 400).

In step S634, the system control unit 201 starts processing for outputting image data in which OSD is not superimposed on a live view image to the external connection destination, and returns to step S606.

In step S635, the system control unit 201 determines whether the connection cable 300 has been removed; it proceeds to step S636 if it is determined that the connection cable 300 has been removed, and proceeds to step S650 if it is not determined that the connection cable 300 has been removed.

In step S636, the system control unit 201 resets the display-OFF timer and the auto power-OFF timer set in the system timer 212, and restarts the display-OFF timer.

In step S637, the system control unit 201 stops image output to the external connection destination.

In step S638, the system control unit 201 determines whether the current state is the display-OFF state; it proceeds to step S639 if it is determined that the current state is the display-OFF state, and proceeds to step S646 if it is not determined that the current state is the display-OFF state.

In step S639, the system control unit 201 cancels the display-OFF state. The system control unit 201 clears the state variable that represents the display-OFF state and is retained in the system memory 213.

In step S640, the system control unit 201 reads out the settings of simultaneous output from the nonvolatile memory 214, and determines whether the output destination indicates simultaneous output (simultaneous display on the display unit 101 and the external apparatus 400). The system control unit 201 proceeds to step S644 if it is determined that the output destination indicates simultaneous output, and proceeds to step S641 if it is not determined that the output destination indicates simultaneous output.

In step S641, the system control unit 201 starts the image capturing processing by controlling the image capturing unit 206.

In step S642, the system control unit 201 sets the output destination to indicate the internal monitor (display unit 101). The system control unit 201 sets the state variable that represents the output destination and is retained in the system memory 213 to indicate the internal monitor (display unit 101).

In step S643, the system control unit 201 lights the internal monitor (display unit 101) by turning ON the power of the internal monitor, performs live view display, and returns to step S606.

In step S644, the system control unit 201 sets the output destination to indicate the internal monitor (display unit 101). The system control unit 201 sets the state variable that represents the output destination and is retained in the system memory 213 to indicate the monitor (display unit 101).

In step S645, the system control unit 201 lights the internal monitor (display unit 101) by turning ON the power of the internal monitor, performs live view display, and returns to step S606.

In step S646, the system control unit 201 reads out the settings of simultaneous output from the nonvolatile memory 214, and determines whether the output destination indicates simultaneous output (simultaneous display on the display unit 101 and the external apparatus 400). The system control unit 201 proceeds to step S649 if it is determined that the output destination indicates simultaneous output, and proceeds to step S647 if it is not determined that the output destination indicates simultaneous output.

In step S647, the system control unit 201 sets the output destination to indicate the internal monitor (display unit 101). The system control unit 201 sets the state variable that represents the output destination and is retained in the system memory 213 to indicate the internal monitor (display unit 101).

In step S648, the system control unit 201 lights the internal monitor (display unit 101) by turning ON the power of the internal monitor, performs live view display, and returns to step S606.

In step S649, the system control unit 201 sets the output destination to indicate the internal monitor (display unit 101), and returns to step S606. The system control unit 201 sets the state variable that represents the output destination and is retained in the system memory 213 to indicate the internal monitor (display unit 101).

In step S650, the system control unit 201 determines whether the time set for the display-OFF timer set in the system timer 212 has come. The system control unit 201 proceeds to step S651 if it is determined that the time set for the display-OFF timer has come, and proceeds to step S662 if it is not determined that the time set for the display-OFF timer has come.

In step S651, the system control unit 201 turns off the light of the internal monitor (display unit 101) by turning OFF the power of the internal monitor, thereby setting the internal monitor to be in the display-OFF state. The system control unit 201 sets the state variable that represents the display-OFF state and is retained in the system memory 213.

In step S652, the system control unit 201 obtains a time set for the auto power-OFF timer from the nonvolatile memory 214.

In step S653, the system control unit 201 sets the auto power-OFF timer in the system timer 212.

In step S654, the system control unit 201 determines whether the output destination indicates the internal monitor (display unit 101). The system control unit 201 proceeds to step S655 if it is determined that the output destination indicates the internal monitor (display unit 101), and proceeds to step S657 if it is not determined that the output destination indicates the internal monitor (display unit 101).

In step S655, the system control unit 201 turns off the light of the internal monitor (display unit 101) by turning OFF the power of the internal monitor.

In step S656, the system control unit 201 stops the image capturing processing by controlling the image capturing unit 206, and returns to step S606.

In step S657, the system control unit 201 determines whether the output destination indicates the external connection destination (external apparatus 400); it proceeds to step S658 if it is determined that the output destination indicates the external connection destination, and proceeds to step S660 if it is not determined that the output destination indicates the external connection destination.

In step S658, the system control unit 201 stops the output of image data to the external connection destination (external apparatus 400).

In step S659, the system control unit 201 stops the image capturing processing by controlling the image capturing unit 206, and returns to step S606.

In step S660, the system control unit 201 reads out the settings of simultaneous output from the nonvolatile memory 214, and determines whether the output destination indicates simultaneous output (simultaneous display on the display unit 101 and the external apparatus 400). The system control unit 201 proceeds to step S661 if it is determined that the output destination indicates simultaneous output, and returns to step S606 if it is not determined that the output destination indicates simultaneous output.

In step S661, the system control unit 201 turns off the light of the internal monitor (display unit 101) by turning OFF the power of the internal monitor, and returns to step S606.

In step S662, the system control unit 201 determines whether the time set for the auto power-OFF timer set in the system timer 212 has come. The system control unit 201 proceeds to step S663 if it is determined that the time set for the auto power-OFF timer has come, and returns to step S606 if it is not determined that the time set for the auto power-OFF timer has come.

In step S663, the system control unit 201 turns OFF the power of the system, thereby setting the system to be in an auto power-OFF state. The system control unit 201 sets a state variable that represents the auto power-OFF state and is retained in the system memory 213.

Figure 7A:
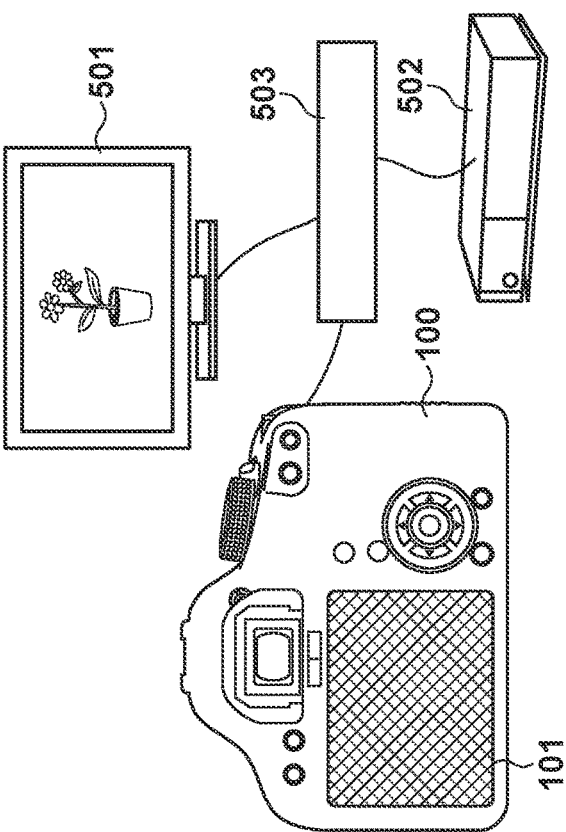
FIGS. 7A and 7B are diagrams illustrating the control processing of the present embodiment.
Figure 7B:
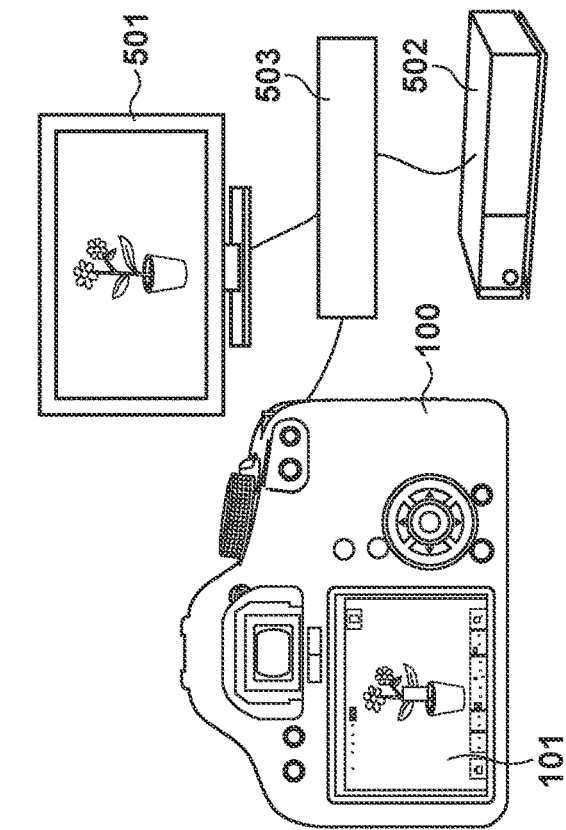

According to the control processing of the present embodiment, when display-OFF has been implemented in a case where the external apparatus 400 is connected to the camera 100 as shown in FIG. 7A and the settings of simultaneous output (simultaneous display on the display unit 101 and the external apparatus 400) have been made, image output to the external apparatus 400 is continued while the power of the display unit 101 is turned OFF as shown in FIG. 7B. By not performing display on the display unit 101 in the above-described manner, power can be saved, and at the same time, the inconvenience whereby image output to the external apparatus 400 is stopped against the user's intention can be resolved.

Although the above-described embodiment is based on the premise that live view display is performed, presumably there is no use case in which image data is recorded on the external apparatus in operating states such as a still image shooting mode, an image reproduction mode, and menu display. In view of this, the settings of simultaneous output may be prohibited in any of the operating states such as the still image shooting mode, the image reproduction mode, and the menu display. Furthermore, in the image reproduction mode, the settings of simultaneous output may be permitted under the assumption that there is a use case in which recording is performed on the external apparatus. In this case, in the image reproduction mode also, similarly to live view display, image output may be stopped upon implementation of display-OFF when only the external apparatus serves as the output destination, and image output may be continued upon implementation of display-OFF at the time of simultaneous output.

Furthermore, the above embodiment has described an example of control in which, upon implementation of display-OFF, image output is stopped when only the external connection destination serves as the output destination, and image output is continued at the time of simultaneous output. In contrast, upon implementation of display-OFF, control may be performed so that, for example, image output is stopped when outputting image data on which OSD is superimposed to the external connection destination, and image output is continued when outputting image data on which OSD is not superimposed. This is because, for the same reason as the case where recording of image data on the external connection destination is expected at the time of simultaneous output, it is unlikely that unclean image data on which OSD is superimposed is recorded when the external connection destination is an image recording device. Therefore, when outputting image data on which OSD is not superimposed to the external connection destination, image output is continued upon implementation of display-OFF so as to preferentially enable appropriate recording of image data on the external apparatus. In addition, when outputting image data on which OSD is superimposed, image output is stopped upon implementation of display-OFF so as to prioritize power saving.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-122355, filed Jun. 27, 2018 which is hereby incorporated by reference herein in its entirety.

What is claimed is:

1. An output apparatus comprising:
   a display;
   an image capturing unit;
   a communication unit configured to communicate with an external apparatus; and
   a control unit configured to control a display function of displaying an image captured by the image capturing unit on the display, and an output function of outputting the image to the external apparatus,
   wherein the control unit performs control to
   (a) restrict the display function and stop image capturing by the image capturing unit when an unoperated state in which no user operation is performed on the output apparatus has continued for a predetermined time period in a state where the display function is in execution and the output function is not in execution, and
   (b) restrict the display function and continue image capturing by the image capturing unit when the unoperated state in which no user operation is performed on the output apparatus has continued for a predetermined time period in a state where both the display function and the output function are in execution, and
   wherein the communication unit and the control unit are collectively implemented using one or more processors.

2. The apparatus according to claim 1, wherein the restricting of the display function includes stopping of the display function.

3. The apparatus according to claim 1, wherein the control unit further stops the output function when the unoperated state in which no user operation is performed on the output apparatus has continued for the predetermined time period in a state where the display function is in execution and the output function is not in execution, and
   wherein the control unit further continues the output function when the unoperated state in which no user operation is performed on the output apparatus has continued for the predetermined time period in a state where both the display function and the output function are in execution.

4. The apparatus according to claim 1, wherein a user operation is capable of making a setting, in advance, so that the display function is not restricted when the predetermined time period has elapsed in the unoperated state in which no user operation is performed on the output apparatus, and
   wherein in a case where the setting has been made so that the display function is not restricted when the predetermined time period has elapsed in the unoperated state in which no user operation is performed on the output apparatus, image capturing by the image capturing unit is continued irrespective of whether the predetermined time period has elapsed in the unoperated state in which no user operation is performed on the output apparatus.

5. The apparatus according to claim 1, wherein the predetermined time period can be set in advance to any value through a predetermined user operation.

6. The apparatus according to claim 5, wherein when a state where both the display function and the output function are in execution is entered, the control unit automatically changes the predetermined time period to a longer time period.

7. The apparatus according to claim 1, wherein upon accepting from a user an instruction to make a transition to a state where the display function is not in execution and the output function is in execution, the user is notified of a condition in which the output function is stopped when the unoperated state in which no user operation is performed on the output apparatus has continued for a predetermined time period.

8. The apparatus according to claim 1, further comprising an accepting unit configured to, while the output function is in execution, accept from a user an operation for instructing the external apparatus to record the image that has been output to the external apparatus,
   wherein the accepting unit is implemented using the one or more processors.

9. The apparatus according to claim 1, further comprising a connection unit configured to connect to a recording medium,
   wherein the control unit (a) further controls a reproduction function of displaying, on the display, contents that have been designated by a user and recorded in the recording medium, and a reproduction output function of outputting the contents that have been designated by the user to the external apparatus, (b) performs control to restrict the reproduction function when the unoperated state in which no user operation is performed on the output apparatus has continued for the predetermined time period in a state where the reproduction function is in execution and the reproduction output function is not in execution, and (c) performs control to restrict the reproduction function and continue the reproduction output function when the unoperated state in which no user operation is performed on the output apparatus has continued for the predetermined time period in a state where the both the reproduction function and the reproduction output function are in execution, and
   wherein the connection unit is implemented using the one or more processors.

10. The apparatus according to claim 1, further comprising a connection unit configured to connect to a recording medium,
    wherein the control unit further controls a reproduction function of displaying, on the display, contents that have been designated by a user and recorded in the recording medium,
    wherein the control unit performs control so that the contents are not output to the external apparatus while the reproduction function is in execution, and wherein the connection unit is implemented using the one or more processors.

11. The apparatus according to claim 1, wherein the output function is not executed while a menu screen is displayed on the display.

12. The apparatus according to claim 1, wherein the output function further includes a function of outputting information to be displayed superimposed on the image, together with the image, to the external apparatus, and wherein during an execution of the function of outputting the information to be displayed superimposed on the image, together with the image, to the external apparatus, the control unit continues image capturing by the image capturing unit even if the predetermined time period has elapsed in the unoperated state in which no user operation is performed on the output apparatus.

13. The apparatus according to claim 1, wherein the control unit performs control to (a) in a state where both the display function and the output function are in execution, display, on the display, information related to a parameter that is used in image capturing processing by the image capturing unit in such a manner that the information is superimposed on the image, and (b) in a state where the display function is not in execution and the output function is in execution, output the information related to the parameter that is used in the image capturing processing by the image capturing unit, together with the image, to the external apparatus.

14. An output apparatus comprising:
a display;
an image capturing unit;
a communication unit configured to communicate with an external apparatus; and
a control unit configured to control a display function of displaying an image captured by the image capturing unit on the display, and an output function of outputting the image captured by the image capturing unit to the external apparatus,
wherein the control unit performs control to
(a) restrict the output of the image to the external apparatus when an unoperated state in which no user operation is performed on the output apparatus has continued for a predetermined time period in a state where the output function is in execution and the display function is not in execution, and
(b) restrict the display function and continue the output of the image to the external apparatus when the unoperated state in which no user operation is performed on the output apparatus has continued for a predetermined time period in a state where both the output function and the display function are in execution,
wherein the communication unit and the control unit are collectively implemented using one or more processors.

15. An output apparatus comprising:
an output unit configured to output an image to an external apparatus; and
a control unit configured to perform control to, when an unoperated state in which no user operation is performed on the output apparatus has continued for a predetermined time period, (a) stop the output of the image to the external apparatus when the output unit is outputting the image and information to be displayed superimposed on the image, and (b) continue the output of the image to the external apparatus when the output unit is outputting the image but is not outputting the information to be displayed superimposed on the image,
wherein the output unit and the control unit are collectively implemented using one or more processors.

16. The apparatus according to claim 15, further comprising a display,
wherein when the image is displayed on the display and the output unit is outputting the image, the control unit performs control to display, on the display, the information to be displayed superimposed on the image, in such a manner that the information is superimposed on the image, and
wherein when the image is not displayed on the display and the output unit is outputting the image, the control unit performs control to output the information to be displayed superimposed on the image, together with the image, to the external apparatus.

17. The apparatus according to claim 16, wherein the information to be displayed superimposed on the image includes a software button for inputting an instruction to the output apparatus.

18. A method of controlling an output apparatus including a display, an image capturing unit, and a communication unit configured to communicate with an external apparatus, wherein the communication unit is implemented using one or more processors, the method comprising:
controlling a display function of displaying an image captured by the image capturing unit on the display, and an output function of outputting the image to the external apparatus,
wherein the controlling performs control to
(a) restrict the display function and stop image capturing by the image capturing unit when an unoperated state in which no user operation is performed on the output apparatus has continued for a predetermined time period in a state where the display function is in execution and the output function is not in execution, and
(b) restrict the display function and continue image capturing by the image capturing unit when the unoperated state in which no user operation is performed on the output apparatus has continued for a predetermined time period in a state where both the display function and the output function are in execution.

19. A method of controlling an output apparatus including a display, an image capturing unit, and a communication unit configured to communicate with an external apparatus, wherein the communication unit is implemented using one or more processors, the method comprising:
controlling a display function of displaying an image captured by the image capturing unit on the display, and an output function of outputting the image captured by the image capturing unit to the external apparatus,
wherein the controlling performs control to
(a) restrict the output of the image to the external apparatus when an unoperated state in which no user operation is performed on the output apparatus has continued for a predetermined time period in a state where the output function is in execution and the display function is not in execution, and
(b) restrict the display function and continue the output of the image to the external apparatus when the unoperated state in which no user operation is performed on the output apparatus has continued for a predetermined time period in a state where both the output function and the display function are in execution.

20. A method of controlling an output apparatus including an output unit configured to output an image to an external apparatus, wherein the output unit is implemented using one or more processors, the method comprising:

performing control to, when an unoperated state in which no user operation is performed on the output apparatus has continued for a predetermined time period, (a) stop the output of the image to the external apparatus when the output unit is outputting the image and information to be displayed superimposed on the image, and (b) continue the output of the image to the external apparatus when the output unit is outputting the image but is not outputting the information to be displayed superimposed on the image.

21. A non-transitory computer-readable storage medium storing a program for causing a computer to function as a communication unit and a control unit of an output apparatus, the output apparatus comprising:

a display; and an image capturing unit, wherein the communication unit is configured to communicate with an external apparatus, and wherein the control unit is configured to control a display function of displaying an image captured by the image capturing unit on the display, and an output function of outputting the image to the external apparatus, and wherein the control unit performs control to (a) restrict the display function and stop image capturing by the image capturing unit when an unoperated state in which no user operation is performed on the output apparatus has continued for a predetermined time period in a state where the display function is in execution and the output function is not in execution, and (b) restrict the display function and continue image capturing by the image capturing unit when the unoperated state in which no user operation is performed on the output apparatus has continued for a predetermined time period in a state where both the display function and the output function are in execution.

22. A non-transitory computer-readable storage medium storing a program for causing a computer to function as a communication unit and a control unit of an output apparatus, the output apparatus comprising:

a display; and an image capturing unit, wherein the communication unit is configured to communicate with an external apparatus, and wherein the control unit is configured to control a display function of displaying an image captured by the image capturing unit on the display, and an output function of outputting the image captured by the image capturing unit to the external apparatus, and wherein the control unit performs control to (a) restrict the output of the image to the external apparatus when an unoperated state in which no user operation is performed on the output apparatus has continued for a predetermined time period in a state where the output function is in execution and the display function is not in execution, and (b) restrict the display function and continue the output of the image to the external apparatus when the unoperated state in which no user operation is performed on the output apparatus has continued for a predetermined time period in a state where both the output function and the display function are in execution.

23. A non-transitory computer-readable storage medium storing a program for causing a computer to function as an output unit and a control unit of an output apparatus, wherein the output unit is configured to output an image to an external apparatus, and wherein the control unit is configured to perform control to, when an unoperated state in which no user operation is performed on the output apparatus has continued for a predetermined time period, (a) stop the output of the image to the external apparatus when the output unit is outputting the image and information to be displayed superimposed on the image, and (b) continue the output of the image to the external apparatus when the output unit is outputting the image but is not outputting the information to be displayed superimposed on the image.

* * * * *